US009720260B2

(12) United States Patent
Calilung et al.

(10) Patent No.: US 9,720,260 B2
(45) Date of Patent: Aug. 1, 2017

(54) MODULAR HEADS-UP DISPLAY SYSTEM

(71) Applicant: Oakley, Inc., Foothill Ranch, CA (US)

(72) Inventors: Ryan Anthony Calilung, Irvine, CA (US); Ryan Saylor, Mission Viejo, CA (US); Carlos D. Reyes, Rancho Santa Margarita, CA (US)

(73) Assignee: Oakley, Inc., Foothill Ranch, CA (US)

( * ) Notice: Subject to any disclaimer, the term of this patent is extended or adjusted under 35 U.S.C. 154(b) by 0 days.

(21) Appl. No.: 14/961,692

(22) Filed: Dec. 7, 2015

(65) Prior Publication Data

US 2016/0085092 A1   Mar. 24, 2016

Related U.S. Application Data

(63) Continuation of application No. PCT/US2014/042066, filed on Jun. 12, 2014.
(Continued)

(51) Int. Cl.
*G02C 1/00* (2006.01)
*G02C 11/00* (2006.01)
(Continued)

(52) U.S. Cl.
CPC .......... *G02C 11/10* (2013.01); *G02B 27/0176* (2013.01); *G02C 5/02* (2013.01);
(Continued)

(58) Field of Classification Search
CPC ............................ G02C 11/10; G02C 2202/08
(Continued)

(56) References Cited

U.S. PATENT DOCUMENTS 1,026,272 A   5/1912  Leveque
1,370,806 A   3/1921  Garner
(Continued)

FOREIGN PATENT DOCUMENTS

CA   2 307 869   4/2000
CH     660531    4/1987
(Continued)

OTHER PUBLICATIONS

Ajluni, Cheryl. "Wearable Wireless Redefines Computer Usage", Wireless Systems Design, pp. 14-16, Dec. 2002.
(Continued)

*Primary Examiner* — Huy K Mai
(74) *Attorney, Agent, or Firm* — Knobbe Martens Olson & Bear, LLP

(57) ABSTRACT

A modular electronic communication system is disclosed with interchangeable components attachable on eyewear. A plurality of pre-existing eyewear models can each be retrofitted by attachment of one or more of such interchangeable components to that eyewear. Such components can be configured for custom attachment with a particular eyewear or such components can be configured for universal attachment with one or more different eyewear models. The communication system can be configured to produce an adjustable heads-up display for the wearer of the eyewear. The electronic communication system can comprise a plurality of interchangeable, electronically interconnected components, such as a first optical module, a first base module, a base link, a second base module, and/or a second optical module. In some embodiments, one or more or all of the components of the electronic communication system are integrally and permanently attached to an eyewear and are not interchangeable or modular.

28 Claims, 6 Drawing Sheets

Related U.S. Application Data

(60) Provisional application No. 61/834,082, filed on Jun. 12, 2013.

(51) Int. Cl.
*G02C 9/00* (2006.01)
*G02C 5/02* (2006.01)
*G02B 27/01* (2006.01)

(52) U.S. Cl.
CPC ........ *G02C 9/00* (2013.01); *G02B 2027/0156* (2013.01); *G02B 2027/0178* (2013.01); *G02C 2200/08* (2013.01)

(58) Field of Classification Search
USPC ....................................................... 351/158
See application file for complete search history.

(56) References Cited

U.S. PATENT DOCUMENTS

| | | |
|---|---|---|
| D130,310 S | 11/1941 | Monjar |
| 2,424,935 A | 7/1947 | Kimmel |
| 2,482,195 A | 9/1949 | Martin |
| 2,504,524 A | 4/1950 | Hayward |
| 2,688,900 A | 9/1954 | Silverman |
| 2,856,466 A | 10/1958 | Gustafson et al. |
| 2,882,348 A | 4/1959 | Erickson |
| 2,915,598 A | 12/1959 | Brunton |
| 2,947,822 A | 8/1960 | Matsuura |
| 2,999,136 A | 9/1961 | Holt et al. |
| 3,104,290 A | 9/1963 | Rosemond et al. |
| 3,119,903 A | 1/1964 | Rosemond et al. |
| D201,050 S | 5/1965 | Gleseking et al. |
| 3,247,330 A | 4/1966 | Hinman |
| D207,919 S | 6/1967 | Lui Fai |
| 3,327,836 A | 6/1967 | Burt |
| 3,371,979 A | 3/1968 | Catanzaro |
| D212,863 S | 12/1968 | Roberts |
| 3,495,898 A | 2/1970 | Del Vecchio |
| 3,536,385 A | 10/1970 | Johnston |
| 3,588,384 A | 6/1971 | Negley |
| 3,665,122 A | 5/1972 | Weiss |
| D228,677 S | 10/1973 | Wichers |
| 3,769,663 A | 11/1973 | Perl |
| D229,974 S | 1/1974 | Wichers et al. |
| 3,809,829 A | 5/1974 | Vignini et al. |
| 3,853,393 A | 12/1974 | Fila et al. |
| 3,883,701 A | 5/1975 | Delorenzo |
| 3,943,925 A | 3/1976 | Leight |
| 3,957,184 A | 5/1976 | Shurman |
| 4,006,974 A | 2/1977 | Resnick |
| 4,149,780 A | 4/1979 | Young |
| 4,247,178 A | 1/1981 | Cook |
| 4,283,127 A | 8/1981 | Rosenwinkel et al. |
| 4,294,792 A | 10/1981 | Arons et al. |
| 4,516,157 A | 5/1985 | Campbell |
| 4,537,612 A | 8/1985 | Borrelli et al. |
| 4,550,984 A | 11/1985 | Reymond |
| 4,584,721 A | 4/1986 | Yamamoto |
| 4,600,077 A | 7/1986 | Drever |
| D287,021 S | 12/1986 | Johnson |
| 4,636,048 A | 1/1987 | Jones |
| 4,683,587 A | 7/1987 | Silverman |
| D292,986 S | 12/1987 | Magestro |
| 4,712,244 A | 12/1987 | Zwicker |
| 4,773,095 A | 9/1988 | Zwicker |
| 4,803,487 A | 2/1989 | Willard et al. |
| 4,806,008 A | 2/1989 | Tarloff |
| 4,806,011 A | 2/1989 | Bettinger |
| 4,856,086 A | 8/1989 | McCullough |
| 4,869,575 A | 9/1989 | Kubik |
| 4,877,320 A | 10/1989 | Holden |
| 4,882,769 A | 11/1989 | Gallimore |
| 4,901,355 A | 2/1990 | Moore |
| 4,902,120 A | 2/1990 | Weyer |
| 4,904,078 A | 2/1990 | Gorike |
| 4,942,629 A | 7/1990 | Stadlmann |
| 4,943,152 A | 7/1990 | Whelen |
| 5,020,150 A | 5/1991 | Shannon |
| 5,029,216 A | 7/1991 | Jhabvala |
| 5,050,150 A | 9/1991 | Ikeda |
| D325,590 S | 4/1992 | Galy |
| 5,123,726 A | 6/1992 | Webster |
| 5,137,342 A | 8/1992 | Jannard |
| 5,159,639 A | 10/1992 | Shannon et al. |
| 5,185,620 A | 2/1993 | Cooper |
| 5,249,001 A | 9/1993 | Jannard |
| 5,260,997 A | 11/1993 | Gattey |
| 5,281,957 A | 1/1994 | Schoolman |
| 5,321,443 A | 6/1994 | Huber et al. |
| 5,327,178 A | 7/1994 | McManigal |
| 5,335,285 A | 8/1994 | Gluz |
| 5,353,378 A | 10/1994 | Hoffman et al. |
| 5,367,345 A | 11/1994 | da Silva |
| 5,381,114 A | 1/1995 | Pena-Finol et al. |
| 5,404,385 A | 4/1995 | Ben-Haim |
| 5,406,340 A | 4/1995 | Hoff |
| 5,452,480 A | 9/1995 | Ryden |
| RE35,051 E | 10/1995 | Moore |
| 5,459,533 A | 10/1995 | McCooeye et al. |
| 5,467,104 A | 11/1995 | Furness, III et al. |
| 5,481,763 A | 1/1996 | Brostrom et al. |
| 5,483,303 A | 1/1996 | Hirschman |
| 5,483,691 A | 1/1996 | Heck et al. |
| 5,533,130 A | 7/1996 | Staton |
| 5,557,444 A | 9/1996 | Melville et al. |
| 5,563,951 A | 10/1996 | Wang et al. |
| 5,579,400 A | 11/1996 | Ballein |
| 5,581,492 A | 12/1996 | Janik |
| 5,583,584 A | 12/1996 | Friedman |
| 5,585,871 A | 12/1996 | Linden |
| 5,590,417 A | 12/1996 | Rydbeck |
| 5,606,743 A | 2/1997 | Vogt et al. |
| 5,608,808 A | 3/1997 | da Silva |
| 5,613,222 A | 3/1997 | Guenther |
| 5,617,477 A | 4/1997 | Boyden |
| 5,634,201 A | 5/1997 | Mooring |
| 5,654,786 A | 8/1997 | Bylander |
| 5,658,502 A | 8/1997 | Hughes |
| 5,668,867 A | 9/1997 | Nagai |
| 5,671,035 A | 9/1997 | Barnes |
| 5,671,037 A | 9/1997 | Ogasawara et al. |
| 5,680,465 A | 10/1997 | Boyden |
| 5,682,434 A | 10/1997 | Boyden |
| 5,694,475 A | 12/1997 | Boyden |
| 5,703,670 A | 12/1997 | Callard |
| 5,708,724 A | 1/1998 | Burris et al. |
| 5,715,323 A | 2/1998 | Walker |
| 5,715,337 A | 2/1998 | Spitzer |
| 5,717,479 A | 2/1998 | Rickards |
| 5,721,783 A | 2/1998 | Anderson |
| D392,990 S | 3/1998 | Hall et al. |
| 5,737,436 A | 4/1998 | Boyden |
| 5,757,929 A | 5/1998 | Wang et al. |
| 5,760,868 A | 6/1998 | Jannard et al. |
| 5,777,715 A | 7/1998 | Kruegle et al. |
| 5,781,272 A | 7/1998 | Bright et al. |
| 5,796,341 A | 8/1998 | Stratiotis |
| 5,805,261 A | 9/1998 | Houston et al. |
| 5,815,126 A | 9/1998 | Fan et al. |
| 5,835,185 A | 11/1998 | Kallman et al. |
| 5,853,005 A | 12/1998 | Scanlon |
| 5,867,572 A | 2/1999 | MacDonald et al. |
| 5,886,822 A | 3/1999 | Spitzer |
| 5,889,843 A | 3/1999 | Singer et al. |
| 5,892,564 A | 4/1999 | Rahn |
| 5,903,395 A | 5/1999 | Rallison et al. |
| 5,909,498 A | 6/1999 | Smith |
| 5,924,868 A | 7/1999 | Rod |
| 5,953,000 A | 9/1999 | Weirich |
| 5,953,434 A | 9/1999 | Boyden |
| 5,973,728 A | 10/1999 | Levitan |
| 5,978,689 A | 11/1999 | Tuoriniemi et al. |
| 5,986,813 A | 11/1999 | Saikawa et al. |

(56) References Cited

U.S. PATENT DOCUMENTS

| | | |
|---|---|---|
| 5,988,812 A | 11/1999 | Wingate |
| 5,991,085 A | 11/1999 | Rallison et al. |
| 5,995,592 A | 11/1999 | Shirai et al. |
| D418,153 S | 12/1999 | Haney |
| 6,006,115 A | 12/1999 | Wingate |
| 6,007,035 A | 12/1999 | Feinbloom et al. |
| 6,010,216 A | 1/2000 | Jesiek |
| 6,012,812 A | 1/2000 | Rickards |
| 6,013,108 A | 1/2000 | Karolys et al. |
| 6,018,742 A | 1/2000 | Herbert, III |
| 6,023,241 A | 2/2000 | Clapper |
| 6,023,372 A | 2/2000 | Spitzer et al. |
| 6,030,342 A | 2/2000 | Amano et al. |
| 6,057,966 A | 5/2000 | Carroll et al. |
| D426,845 S | 6/2000 | Green et al. |
| 6,074,060 A | 6/2000 | Bruce |
| 6,084,555 A | 7/2000 | Mizoguchi et al. |
| 6,084,556 A | 7/2000 | Zwern |
| 6,091,546 A | 7/2000 | Spitzer |
| 6,091,812 A | 7/2000 | Iglehart et al. |
| 6,091,832 A | 7/2000 | Shurman et al. |
| D430,145 S | 8/2000 | Boyden et al. |
| 6,106,116 A | 8/2000 | Houston et al. |
| 6,108,197 A | 8/2000 | Janik |
| 6,110,110 A | 8/2000 | Dublin, Jr. et al. |
| 6,126,595 A | 10/2000 | Amano et al. |
| 6,142,623 A | 11/2000 | Jones |
| 6,149,272 A | 11/2000 | Bergner et al. |
| D435,058 S | 12/2000 | Green et al. |
| 6,157,533 A | 12/2000 | Sallam et al. |
| 6,169,543 B1 | 1/2001 | Wehmeyer |
| 6,176,576 B1 | 1/2001 | Green et al. |
| 6,181,956 B1 | 1/2001 | Koskan |
| 6,192,253 B1 | 2/2001 | Charlier et al. |
| 6,204,974 B1 | 3/2001 | Spitzer |
| 6,211,799 B1 | 4/2001 | Post et al. |
| 6,212,414 B1 | 4/2001 | Alameh et al. |
| 6,212,424 B1 | 4/2001 | Robinson |
| 6,218,958 B1 | 4/2001 | Eichstaedt et al. |
| D441,388 S | 5/2001 | Lightman |
| 6,225,897 B1 | 5/2001 | Doyle et al. |
| 6,230,327 B1 | 5/2001 | Briand et al. |
| 6,231,181 B1 | 5/2001 | Swab |
| 6,233,344 B1 | 5/2001 | Clegg et al. |
| 6,233,345 B1 | 5/2001 | Urwyler |
| 6,239,778 B1 | 5/2001 | Palffy-Muhoray et al. |
| 6,243,578 B1 | 6/2001 | Koike |
| 6,252,970 B1 | 6/2001 | Poon et al. |
| D445,416 S | 7/2001 | Glezerman |
| 6,272,359 B1 | 8/2001 | Kivela et al. |
| 6,280,838 B1 | 8/2001 | Bernards et al. |
| 6,285,757 B1 | 9/2001 | Carroll et al. |
| 6,292,213 B1 | 9/2001 | Jones |
| 6,301,050 B1 | 10/2001 | DeLeon |
| 6,301,367 B1 | 10/2001 | Boyden et al. |
| 6,301,593 B1 | 10/2001 | Toyosato |
| 6,307,526 B1 | 10/2001 | Mann |
| 6,311,155 B1 | 10/2001 | Vaudrey et al. |
| 6,312,811 B1 | 11/2001 | Frigoli et al. |
| 6,314,091 B1 | 11/2001 | LaRowe, Jr. et al. |
| 6,325,507 B1 | 12/2001 | Jannard et al. |
| 6,325,513 B1 | 12/2001 | Bergner et al. |
| 6,344,727 B1 | 2/2002 | Desai et al. |
| 6,347,095 B1 | 2/2002 | Tang et al. |
| 6,349,001 B1 | 2/2002 | Spitzer |
| 6,350,129 B1 | 2/2002 | Gorlick |
| 6,351,468 B1 | 2/2002 | LaRowe, Jr. et al. |
| 6,353,422 B1 | 3/2002 | Perlman |
| 6,353,503 B1 | 3/2002 | Spitzer et al. |
| 6,356,392 B1 | 3/2002 | Spitzer |
| 6,374,177 B1 | 4/2002 | Lee et al. |
| 6,381,484 B1 | 4/2002 | Ayanruoh |
| 6,384,982 B1 | 5/2002 | Spitzer |
| 6,392,798 B1 | 5/2002 | Newkirk |
| 6,409,338 B1 | 6/2002 | Jewell |
| 6,417,969 B1 | 7/2002 | DeLuca et al. |
| 6,421,031 B1 | 7/2002 | Ronzani et al. |
| 6,424,820 B1 | 7/2002 | Burdick et al. |
| 6,431,705 B1 | 8/2002 | Linden |
| 6,442,018 B1 | 8/2002 | Dinkin |
| D462,708 S | 9/2002 | Miller et al. |
| D462,946 S | 9/2002 | Beraut et al. |
| 6,445,805 B1 | 9/2002 | Grugel |
| 6,452,572 B1 | 9/2002 | Fan et al. |
| 6,452,699 B1 | 9/2002 | Athale et al. |
| 6,456,721 B1 | 9/2002 | Fukuda |
| 6,474,816 B2 | 11/2002 | Butler |
| 6,476,815 B1 | 11/2002 | Ando |
| 6,483,483 B2 | 11/2002 | Kosugi et al. |
| 6,490,362 B1 | 12/2002 | Clegg et al. |
| 6,493,136 B2 | 12/2002 | Chang et al. |
| 6,510,325 B1 | 1/2003 | Mack, II et al. |
| 6,517,203 B1 | 2/2003 | Blum et al. |
| 6,519,475 B1 | 2/2003 | Kim |
| 6,523,006 B1 | 2/2003 | Ellis et al. |
| 6,529,804 B1 | 3/2003 | Draggon et al. |
| 6,538,799 B2 | 3/2003 | Spitzer |
| 6,540,347 B1 | 4/2003 | Radziwon et al. |
| 6,542,081 B2 | 4/2003 | Torch |
| 6,546,101 B1 | 4/2003 | Murray et al. |
| 6,549,122 B2 | 4/2003 | Depta |
| 6,554,763 B1 | 4/2003 | Amano et al. |
| 6,560,029 B1 | 5/2003 | Dobbie et al. |
| 6,560,449 B1 | 5/2003 | Liu |
| 6,564,047 B1 | 5/2003 | Steele et al. |
| 6,567,651 B2 | 5/2003 | Whitley |
| 6,580,405 B1 | 6/2003 | Yamazaki et al. |
| 6,582,075 B1 | 6/2003 | Swab et al. |
| 6,614,407 B2 | 9/2003 | Perlman |
| 6,618,099 B1 | 9/2003 | Spitzer |
| 6,629,076 B1 | 9/2003 | Haken |
| 6,639,706 B2 | 10/2003 | Ziv et al. |
| 6,650,894 B1 | 11/2003 | Berstis et al. |
| 6,657,673 B2 | 12/2003 | Ishikawa |
| 6,687,486 B2 | 2/2004 | Grzeczkowski |
| 6,690,807 B1 | 2/2004 | Meyer |
| 6,691,028 B2 | 2/2004 | Bullock et al. |
| 6,717,533 B2 | 4/2004 | Seaberg et al. |
| 6,724,354 B1 | 4/2004 | Spitzer et al. |
| 6,725,022 B1 | 4/2004 | Clayton et al. |
| 6,728,531 B1 | 4/2004 | Lee et al. |
| 6,729,726 B2 | 5/2004 | Miller et al. |
| 6,731,908 B2 | 5/2004 | Berliner et al. |
| 6,733,130 B2 | 5/2004 | Blum et al. |
| 6,735,435 B2 | 5/2004 | Newell et al. |
| 6,736,759 B1 | 5/2004 | Stubbs et al. |
| 6,739,873 B1 | 5/2004 | Rod et al. |
| 6,763,119 B2 | 7/2004 | Lee |
| 6,766,182 B2 | 7/2004 | Janninck et al. |
| 6,769,767 B2 | 8/2004 | Swab et al. |
| 6,783,501 B2 | 8/2004 | Takahashi et al. |
| 6,816,314 B2 | 11/2004 | Shimizu et al. |
| 6,834,192 B1 | 12/2004 | Watanabe et al. |
| 6,834,509 B2 | 12/2004 | Palfy et al. |
| 6,851,805 B2 | 2/2005 | Blum et al. |
| 6,871,951 B2 | 3/2005 | Blum et al. |
| 6,873,862 B2 | 3/2005 | Reshefsky |
| 6,879,443 B2 | 4/2005 | Spitzer |
| 6,885,848 B2 | 4/2005 | Lee |
| 6,911,172 B2 | 6/2005 | Swab et al. |
| 6,912,386 B1 | 6/2005 | Himberg et al. |
| 6,920,283 B2 | 7/2005 | Goldstein |
| 6,929,365 B2 | 8/2005 | Swab et al. |
| 6,937,400 B2 | 8/2005 | Olsson |
| 6,937,803 B2 | 8/2005 | Bruegl |
| 6,941,248 B2 | 9/2005 | Friedrich et al. |
| 6,947,014 B2 | 9/2005 | Wooten |
| 6,950,531 B2 | 9/2005 | Rickards |
| 6,957,890 B2 | 10/2005 | Shapiro |
| 6,966,647 B2 | 11/2005 | Jannard et al. |
| 6,975,667 B2 | 12/2005 | Mattisson et al. |
| 6,978,162 B2 | 12/2005 | Russell et al. |
| 6,990,082 B1 | 1/2006 | Zehavi et al. |
| 7,004,582 B2 | 2/2006 | Jannard et al. |

(56) References Cited

U.S. PATENT DOCUMENTS

| | | |
|---|---|---|
| 7,013,009 B2 | 3/2006 | Warren |
| 7,031,483 B2 | 4/2006 | Boone et al. |
| 7,031,667 B2 | 4/2006 | Horiguchi |
| 7,044,615 B2 | 5/2006 | Gesten |
| 7,062,796 B1 | 6/2006 | Dixon |
| 7,084,736 B2 | 8/2006 | Ritter |
| 7,093,742 B2 | 8/2006 | Steven, III et al. |
| 7,097,300 B2 | 8/2006 | Himmele |
| 7,099,464 B2 | 8/2006 | Lucey et al. |
| 7,106,676 B2 | 9/2006 | Matos |
| 7,116,976 B2 | 10/2006 | Thomas et al. |
| 7,124,425 B1 | 10/2006 | Anderson |
| 7,133,532 B2 | 11/2006 | Rickards |
| 7,147,324 B2 | 12/2006 | Jannard et al. |
| 7,149,475 B2 | 12/2006 | Kawamura |
| 7,150,526 B2 | 12/2006 | Jannard et al. |
| 7,158,096 B1 | 1/2007 | Spitzer |
| 7,158,499 B2 | 1/2007 | Anderson et al. |
| 7,162,281 B2 | 1/2007 | Kim |
| 7,168,804 B2 | 1/2007 | Velazquez |
| 7,170,057 B2 | 1/2007 | Filipovich et al. |
| 7,185,983 B2 | 3/2007 | Nelson et al. |
| 7,187,948 B2 | 3/2007 | Alden |
| 7,187,960 B2 | 3/2007 | Abreu |
| 7,192,136 B2 | 3/2007 | Howell et al. |
| 7,192,137 B2 | 3/2007 | Ishibashi et al. |
| 7,195,353 B2 | 3/2007 | Blum et al. |
| 7,211,778 B1 | 5/2007 | Smith et a |
| 7,213,917 B2 | 5/2007 | Jannard et al. |
| 7,216,973 B2 | 5/2007 | Jannard et al. |
| 7,219,994 B2 | 5/2007 | Jannard et al. |
| 7,231,038 B2 | 6/2007 | Warren |
| 7,242,527 B2 | 7/2007 | Spitzer |
| 7,245,273 B2 | 7/2007 | Eberl et al. |
| 7,253,791 B2 | 8/2007 | Kahan et al. |
| 7,255,437 B2 | 8/2007 | Howell et al. |
| 7,261,409 B1 | 8/2007 | Taber |
| 7,264,350 B2 | 9/2007 | Jannard et al. |
| 7,278,734 B2 | 10/2007 | Jannard et al. |
| 7,289,640 B2 | 10/2007 | Tsai et al. |
| 7,289,767 B2 | 10/2007 | Lai |
| 7,292,703 B2 | 11/2007 | Kaulfuss et al. |
| 7,308,231 B2 | 12/2007 | Tung |
| 7,312,699 B2 | 12/2007 | Chornenky |
| 7,313,246 B2 | 12/2007 | Miller et al. |
| 7,321,785 B2 | 1/2008 | Harris |
| 7,331,666 B2 | 2/2008 | Swab et al. |
| 7,376,434 B2 | 5/2008 | Thomas et al. |
| 7,380,936 B2 | 6/2008 | Howell et al. |
| 7,381,952 B2 | 6/2008 | Teich et al. |
| 7,395,090 B2 | 7/2008 | Alden |
| 7,401,918 B2 | 7/2008 | Howell et al. |
| 7,409,234 B2 | 8/2008 | Glezerman |
| 7,410,254 B2 | 8/2008 | Goodis |
| 7,436,568 B1 | 10/2008 | Kuykendall, Jr. |
| 7,438,409 B2 | 10/2008 | Jordan |
| 7,438,410 B1 | 10/2008 | Howell et al. |
| 7,445,332 B2 | 11/2008 | Jannard et al. |
| 7,451,056 B2 | 11/2008 | Flentov et al. |
| 7,452,073 B2 | 11/2008 | Jannard et al. |
| 7,461,936 B2 | 12/2008 | Jannard |
| 7,467,866 B2 | 12/2008 | Chao |
| 7,481,531 B2 | 1/2009 | Howell et al. |
| 7,484,847 B2 | 2/2009 | Fuziak, Jr. |
| 7,488,294 B2 | 2/2009 | Torch |
| 7,490,936 B2 | 2/2009 | Blum et al. |
| 7,494,216 B2 | 2/2009 | Jannard et al. |
| 7,496,293 B2 | 2/2009 | Shamir et al. |
| 7,500,746 B1 | 3/2009 | Howell et al. |
| 7,500,747 B2 | 3/2009 | Howell et al. |
| 7,512,414 B2 | 3/2009 | Jannard et al. |
| 7,520,614 B2 | 4/2009 | Joos et al. |
| 7,527,375 B2 | 5/2009 | Blum et al. |
| 7,530,688 B2 | 5/2009 | Grogan et al. |
| 7,543,934 B2 | 6/2009 | Howell et al. |
| 7,547,101 B2 | 6/2009 | Fuziak |
| 7,576,800 B2 | 8/2009 | Swain |
| 7,576,919 B2 | 8/2009 | Durner et al. |
| 7,581,833 B2 | 9/2009 | Howell et al. |
| 7,617,071 B2 | 11/2009 | Darley et al. |
| 7,621,634 B2 | 11/2009 | Howell et al. |
| 7,631,968 B1 | 12/2009 | Dobson et al. |
| 7,647,400 B2 | 1/2010 | Abbott et al. |
| 7,648,236 B1 | 1/2010 | Dobson |
| D610,184 S | 2/2010 | Pearson et al. |
| 7,665,845 B2 | 2/2010 | Kiderman et al. |
| 7,675,683 B2 | 3/2010 | Dobson |
| 7,677,722 B1 | 3/2010 | Mednick et al. |
| 7,677,723 B2 | 3/2010 | Howell et al. |
| 7,682,018 B2 | 3/2010 | Jannard |
| 7,724,210 B2 | 5/2010 | Sprague et al. |
| 7,729,688 B2 | 6/2010 | Cheung et al. |
| 7,740,353 B2 * | 6/2010 | Jannard .............. A61B 5/1112 351/158 |
| 7,744,213 B2 | 6/2010 | Jannard et al. |
| 7,753,523 B2 | 7/2010 | Kiderman et al. |
| 7,758,185 B2 | 7/2010 | Lewis |
| 7,760,898 B2 | 7/2010 | Howell et al. |
| 7,771,046 B2 | 8/2010 | Howell et al. |
| 7,784,935 B2 | 8/2010 | Jackson et al. |
| 7,786,424 B2 | 8/2010 | Durner et al. |
| 7,792,552 B2 | 9/2010 | Thomas et al. |
| 7,798,638 B2 | 9/2010 | Fuziak, Jr. |
| 7,806,525 B2 | 10/2010 | Howell et al. |
| 7,810,750 B2 | 10/2010 | Abreu |
| 7,843,403 B2 | 11/2010 | Spitzer |
| 7,866,818 B2 | 1/2011 | Schroeder et al. |
| 7,869,128 B2 | 1/2011 | Yamaguchi et al. |
| 7,874,669 B2 | 1/2011 | Moritz et al. |
| 7,890,128 B1 | 2/2011 | Thomas et al. |
| 7,900,068 B2 | 3/2011 | Spitzer |
| 7,918,556 B2 | 4/2011 | Lewis |
| 7,922,321 B2 | 4/2011 | Howell et al. |
| 7,931,367 B2 | 4/2011 | Jackson et al. |
| 7,931,373 B2 | 4/2011 | Hillis et al. |
| 7,959,287 B1 | 6/2011 | Saffra |
| 7,967,433 B2 | 6/2011 | Jannard et al. |
| 7,967,435 B1 | 6/2011 | Seeto |
| 7,971,994 B2 | 7/2011 | Blum et al. |
| 7,988,283 B2 | 8/2011 | Jannard |
| 7,997,723 B2 | 8/2011 | Pienimaa et al. |
| 8,010,156 B2 | 8/2011 | Warren |
| D645,492 S | 9/2011 | Zhao |
| D645,493 S | 9/2011 | Zhao |
| 8,020,989 B2 | 9/2011 | Jannard et al. |
| 8,025,398 B2 | 9/2011 | Jannard |
| D646,316 S | 10/2011 | Zhao |
| 8,068,169 B2 | 11/2011 | Chang |
| 8,086,287 B2 | 12/2011 | Mooney et al. |
| 8,104,892 B2 | 1/2012 | Hillis et al. |
| 8,109,629 B2 | 2/2012 | Howell et al. |
| 8,112,104 B1 | 2/2012 | Thomas et al. |
| 8,123,351 B2 | 2/2012 | Moritz et al. |
| 8,128,606 B2 | 3/2012 | Anderson et al. |
| 8,136,170 B2 | 3/2012 | DiPaola |
| 8,188,880 B1 | 5/2012 | Chi et al. |
| 8,204,435 B2 | 6/2012 | Seshadri et al. |
| 8,212,855 B2 | 7/2012 | Gupta et al. |
| 8,243,973 B2 | 8/2012 | Rickards et al. |
| 8,259,159 B2 | 9/2012 | Hu |
| 8,269,159 B2 | 9/2012 | Filipovich et al. |
| 8,280,419 B1 | 10/2012 | Thomas et al. |
| 8,289,231 B2 | 10/2012 | Budd et al. |
| 8,310,555 B2 | 11/2012 | Ludlow |
| 8,313,192 B2 | 11/2012 | Jannard |
| 8,325,263 B2 | 12/2012 | Kato et al. |
| 8,333,475 B2 | 12/2012 | Sugio et al. |
| 8,337,013 B2 | 12/2012 | Howell et al. |
| 8,337,014 B2 | 12/2012 | Kokonaski et al. |
| 8,353,594 B2 | 1/2013 | Lewis |
| 8,378,924 B2 | 2/2013 | Jacobsen et al. |
| 8,414,131 B2 | 4/2013 | Tanaka |
| 8,430,507 B2 | 4/2013 | Howell et al. |
| 8,430,510 B2 | 4/2013 | Sugio et al. |

(56) References Cited

U.S. PATENT DOCUMENTS

| | | |
|---|---|---|
| 8,431,881 B2 | 4/2013 | Filipovich et al. |
| 8,434,863 B2 | 5/2013 | Howell et al. |
| 8,434,868 B2 | 5/2013 | Sato et al. |
| 8,446,676 B2 | 5/2013 | Sugihara et al. |
| 8,449,116 B2 | 5/2013 | Sato et al. |
| 8,465,151 B2 | 6/2013 | Howell et al. |
| 8,473,004 B2 | 6/2013 | Warren |
| 8,482,488 B2 | 7/2013 | Jannard |
| 8,500,271 B2 | 8/2013 | Howell et al. |
| 8,503,703 B2 | 8/2013 | Eaton et al. |
| 8,523,352 B2 | 9/2013 | Jannard et al. |
| 8,550,621 B2 | 10/2013 | Jannard |
| 8,550,649 B2 | 10/2013 | Nelson et al. |
| 8,553,910 B1 | 10/2013 | Dong et al. |
| 8,566,962 B2 | 10/2013 | Cornelius |
| 8,622,885 B2 | 1/2014 | Mersky |
| 8,721,562 B2 | 5/2014 | Abreu |
| 8,737,978 B1 | 5/2014 | Thomas et al. |
| 8,744,113 B1 | 6/2014 | Rickards |
| 8,744,407 B2 | 6/2014 | Cheung et al. |
| 8,758,021 B2 | 6/2014 | Takahashi |
| 8,770,742 B2 | 7/2014 | Howell et al. |
| 8,787,970 B2 | 7/2014 | Warren |
| 8,801,174 B2 | 8/2014 | Willey |
| 8,854,429 B2 | 10/2014 | Seo et al. |
| 8,855,719 B2 | 10/2014 | Jacobsen et al. |
| 8,876,285 B2 | 11/2014 | Jannard |
| 8,878,914 B2 | 11/2014 | Mashitani et al. |
| 8,891,817 B2 | 11/2014 | Wexler et al. |
| 8,902,303 B2 | 12/2014 | Na'aman et al. |
| 8,905,542 B2 | 12/2014 | Howell et al. |
| 8,920,013 B2 | 12/2014 | Nakamura |
| 8,928,752 B2 | 1/2015 | DeKeyser |
| 9,016,857 B2 | 4/2015 | Benko et al. |
| 9,028,062 B2 | 5/2015 | Kokonaski et al. |
| 9,028,123 B2 | 5/2015 | Nichol et al. |
| 9,451,068 B2 | 9/2016 | Warren |
| 2001/0009410 A1 | 7/2001 | Fujita |
| 2001/0038491 A1 | 11/2001 | Fergason |
| 2002/0039063 A1 | 4/2002 | Ritter |
| 2002/0039170 A1 | 4/2002 | Jannard et al. |
| 2002/0044152 A1 | 4/2002 | Abbott, III et al. |
| 2002/0085175 A1 | 7/2002 | Butler |
| 2002/0085843 A1 | 7/2002 | Mann |
| 2002/0087330 A1 | 7/2002 | Lee et al. |
| 2002/0093466 A1 | 7/2002 | Ben-Arie |
| 2002/0098877 A1 | 7/2002 | Glezerman |
| 2002/0098878 A1 | 7/2002 | Mooney et al. |
| 2002/0111197 A1 | 8/2002 | Fitzgerald |
| 2002/0118825 A1 | 8/2002 | Mitra |
| 2002/0143912 A1 | 10/2002 | Michels |
| 2002/0159023 A1 | 10/2002 | Swab et al. |
| 2002/0169539 A1 | 11/2002 | Menard et al. |
| 2002/0170147 A1 | 11/2002 | Heller |
| 2002/0176330 A1 | 11/2002 | Ramonowski et al. |
| 2002/0186180 A1 | 12/2002 | Duda |
| 2002/0197961 A1 | 12/2002 | Warren |
| 2003/0003969 A1 | 1/2003 | Tong et al. |
| 2003/0018274 A1 | 1/2003 | Takahashi et al. |
| 2003/0022690 A1 | 1/2003 | Beyda et al. |
| 2003/0026586 A1 | 2/2003 | Bruegl et al. |
| 2003/0036360 A1 | 2/2003 | Russell et al. |
| 2003/0058406 A1 | 3/2003 | Blum et al. |
| 2003/0067585 A1 | 4/2003 | Miller et al. |
| 2003/0068057 A1 | 4/2003 | Miller et al. |
| 2003/0073460 A1 | 4/2003 | van Pelt et al. |
| 2003/0090439 A1 | 5/2003 | Spitzer |
| 2003/0156725 A1 | 8/2003 | Boone et al. |
| 2003/0162510 A1 | 8/2003 | Kim |
| 2004/0000733 A1 | 1/2004 | Swab et al. |
| 2004/0015403 A1 | 1/2004 | Moskowitz et al. |
| 2004/0029582 A1 | 2/2004 | Swab et al. |
| 2004/0044418 A1 | 3/2004 | Goldstein |
| 2004/0044427 A1 | 3/2004 | Neuhaus |
| 2004/0048569 A1 | 3/2004 | Kawamura |
| 2004/0072134 A1 | 4/2004 | Takahashi |
| 2004/0120035 A1 | 6/2004 | Hoffmann |
| 2004/0128399 A1 | 7/2004 | Kurrasch |
| 2004/0128737 A1 | 7/2004 | Gesten |
| 2004/0132509 A1 | 7/2004 | Glezerman |
| 2004/0136293 A1 | 7/2004 | Matos |
| 2004/0156012 A1 | 8/2004 | Jannard et al. |
| 2004/0157649 A1 | 8/2004 | Jannard et al. |
| 2004/0160571 A1 | 8/2004 | Jannard et al. |
| 2004/0160572 A1 | 8/2004 | Jannard et al. |
| 2004/0160573 A1 | 8/2004 | Jannard et al. |
| 2004/0212776 A1 | 10/2004 | Spitzer et al. |
| 2004/0239874 A1 | 12/2004 | Swab et al. |
| 2004/0240404 A1 | 12/2004 | Ibrahim et al. |
| 2005/0001981 A1 | 1/2005 | Anderson et al. |
| 2005/0040192 A1 | 2/2005 | Steven, III et al. |
| 2005/0041297 A1 | 2/2005 | He et al. |
| 2005/0046789 A1 | 3/2005 | Jannard et al. |
| 2005/0046790 A1 | 3/2005 | Jannard et al. |
| 2005/0052537 A1 | 3/2005 | Mizusawa |
| 2005/0128431 A1 | 6/2005 | Jannard et al. |
| 2005/0159182 A1 | 7/2005 | Lai |
| 2005/0174651 A1 | 8/2005 | Spitzer |
| 2005/0185815 A1 | 8/2005 | Rickards |
| 2005/0186993 A1 | 8/2005 | Yueh |
| 2005/0201585 A1 | 9/2005 | Jannard et al. |
| 2005/0202857 A1 | 9/2005 | Seshadri et al. |
| 2005/0208457 A1 | 9/2005 | Fink et al. |
| 2005/0208893 A1 | 9/2005 | Yueh |
| 2005/0219152 A1 | 10/2005 | Budd et al. |
| 2005/0225867 A1 | 10/2005 | Ishibashi et al. |
| 2005/0238194 A1 | 10/2005 | Chornenky |
| 2005/0239502 A1 | 10/2005 | Swab et al. |
| 2005/0248722 A1 | 11/2005 | Nelis |
| 2005/0264502 A1 | 12/2005 | Sprague et al. |
| 2005/0275714 A1 | 12/2005 | Ishikawa et al. |
| 2005/0283263 A1 | 12/2005 | Eaton et al. |
| 2006/0009154 A1 | 1/2006 | Tung |
| 2006/0023158 A1 | 2/2006 | Howell et al. |
| 2006/0028400 A1 | 2/2006 | Lapstun et al. |
| 2006/0030360 A1 | 2/2006 | Yeh |
| 2006/0034478 A1 | 2/2006 | Davenport |
| 2006/0046656 A1 | 3/2006 | Yang |
| 2006/0046736 A1 | 3/2006 | Pering |
| 2006/0072067 A1 | 4/2006 | Jannard et al. |
| 2006/0093178 A1 | 5/2006 | Chen |
| 2006/0109350 A1 | 5/2006 | Yeh |
| 2006/0132382 A1 | 6/2006 | Jannard |
| 2006/0146277 A1 | 7/2006 | Jannard et al. |
| 2006/0160573 A1 | 7/2006 | Montvay |
| 2006/0183427 A1 | 8/2006 | Warren |
| 2006/0187404 A1 | 8/2006 | Ifergan |
| 2006/0192306 A1 | 8/2006 | Giller |
| 2006/0197907 A1 | 9/2006 | Jannard et al. |
| 2006/0203183 A1 | 9/2006 | Jannard et al. |
| 2006/0203184 A1 | 9/2006 | Jannard et al. |
| 2007/0000033 A1 | 1/2007 | Dixon |
| 2007/0008484 A1 | 1/2007 | Jannard |
| 2007/0013863 A1 | 1/2007 | Zelazowski |
| 2007/0013864 A1 | 1/2007 | Dietz |
| 2007/0030442 A1 | 2/2007 | Howell et al. |
| 2007/0037520 A1 | 2/2007 | Warren |
| 2007/0046887 A1 | 3/2007 | Howell et al. |
| 2007/0064311 A1 | 3/2007 | Park |
| 2007/0081123 A1 | 4/2007 | Lewis |
| 2007/0081124 A1 | 4/2007 | Lewis |
| 2007/0081125 A1 | 4/2007 | Lewis |
| 2007/0201000 A1 | 8/2007 | Jackson et al. |
| 2007/0208531 A1 | 9/2007 | Darley et al. |
| 2007/0222940 A1 | 9/2007 | Cohen |
| 2007/0225550 A1 | 9/2007 | Gattani et al. |
| 2008/0013037 A1 | 1/2008 | Carollo |
| 2008/0055410 A1 | 3/2008 | DeKeyser |
| 2008/0058681 A1 | 3/2008 | Casali et al. |
| 2008/0089545 A1 | 4/2008 | Jannard et al. |
| 2008/0144854 A1 | 6/2008 | Abreu |
| 2008/0158506 A1 | 7/2008 | Fuziak |
| 2008/0165317 A1 | 7/2008 | Wilson |
| 2008/0169998 A1 | 7/2008 | Jacobsen et al. |

(56) References Cited

U.S. PATENT DOCUMENTS

| | | |
|---|---|---|
| 2008/0192114 A1 | 8/2008 | Pearson et al. |
| 2008/0198324 A1 | 8/2008 | Fuziak |
| 2008/0204589 A1 | 8/2008 | Chang |
| 2008/0239232 A1 | 10/2008 | Guerrero |
| 2008/0273084 A1 | 11/2008 | MacDougall et al. |
| 2008/0284974 A1 | 11/2008 | Siu |
| 2008/0309586 A1 | 12/2008 | Vitale |
| 2009/0059381 A1 | 3/2009 | Jannard |
| 2009/0066910 A1 | 3/2009 | Jannard et al. |
| 2009/0073330 A1 | 3/2009 | Viala |
| 2009/0086159 A1 | 4/2009 | Jannard |
| 2009/0122253 A1 | 5/2009 | Clay |
| 2009/0180194 A1 | 7/2009 | Yamaguchi et al. |
| 2009/0190026 A1 | 7/2009 | Chen |
| 2009/0201460 A1 | 8/2009 | Blum et al. |
| 2009/0201466 A1 | 8/2009 | Knecht et al. |
| 2009/0251661 A1 | 10/2009 | Fuziak, Jr. |
| 2009/0307828 A1 | 12/2009 | Ludlow |
| 2010/0002186 A1 | 1/2010 | Zelman |
| 2010/0026970 A1 | 2/2010 | Tanaka |
| 2010/0110368 A1 | 5/2010 | Chaum |
| 2010/0128135 A1 | 5/2010 | Filipovich et al. |
| 2010/0177168 A1 | 7/2010 | Hu |
| 2010/0177201 A1 | 7/2010 | Filipovich et al. |
| 2010/0188489 A1 | 7/2010 | Mashitani et al. |
| 2010/0208121 A1 | 8/2010 | Kato et al. |
| 2010/0220282 A1 | 9/2010 | Moritz et al. |
| 2010/0238396 A1 | 9/2010 | Jannard |
| 2010/0245755 A1* | 9/2010 | Sugihara ............ G02B 27/0172 351/158 |
| 2010/0253904 A1 | 10/2010 | Jannard |
| 2010/0265455 A1 | 10/2010 | Jannard et al. |
| 2010/0277563 A1 | 11/2010 | Gupta et al. |
| 2010/0309426 A1 | 12/2010 | Howell et al. |
| 2010/0309427 A1 | 12/2010 | Warren |
| 2011/0050546 A1 | 3/2011 | Swartz, Jr. et al. |
| 2011/0080555 A1 | 4/2011 | Chow |
| 2011/0085135 A1 | 4/2011 | Bertolli |
| 2011/0102733 A1 | 5/2011 | Moritz et al. |
| 2011/0170065 A1 | 7/2011 | Sugio et al. |
| 2011/0170066 A1 | 7/2011 | Sugio et al. |
| 2011/0170067 A1 | 7/2011 | Sato et al. |
| 2011/0178784 A1 | 7/2011 | Sato et al. |
| 2011/0187640 A1 | 8/2011 | Jacobsen et al. |
| 2011/0193963 A1 | 8/2011 | Hess et al. |
| 2011/0255050 A1 | 10/2011 | Jannard et al. |
| 2011/0261166 A1 | 10/2011 | Olazaran |
| 2011/0261176 A1 | 10/2011 | Monaghan, Sr. et al. |
| 2011/0273906 A1 | 11/2011 | Nichol et al. |
| 2011/0310345 A1 | 12/2011 | Warren |
| 2012/0013843 A1 | 1/2012 | Jannard |
| 2012/0069448 A1 | 3/2012 | Sugihara et al. |
| 2012/0081658 A1* | 4/2012 | Sugihara ............ G02B 27/0176 351/158 |
| 2012/0105740 A1 | 5/2012 | Jannard et al. |
| 2012/0169854 A1 | 7/2012 | Seo et al. |
| 2012/0210489 A1 | 8/2012 | Abreu |
| 2012/0212414 A1 | 8/2012 | Osterhout et al. |
| 2012/0220234 A1 | 8/2012 | Abreu |
| 2012/0224135 A1 | 9/2012 | Moritz |
| 2013/0072828 A1 | 3/2013 | Sweis et al. |
| 2013/0091623 A1 | 4/2013 | McCulloch et al. |
| 2013/0100410 A1 | 4/2013 | Liang |
| 2013/0100534 A1 | 4/2013 | Jannard |
| 2013/0212765 A1 | 8/2013 | Cornelius |
| 2013/0214998 A1 | 8/2013 | Andes et al. |
| 2013/0235331 A1 | 9/2013 | Heinrich et al. |
| 2013/0250232 A1 | 9/2013 | Belbey et al. |
| 2013/0250233 A1 | 9/2013 | Blum et al. |
| 2013/0281166 A1 | 10/2013 | Warren |
| 2013/0293448 A1 | 11/2013 | Jannard |
| 2014/0002629 A1 | 1/2014 | Ratcliff et al. |
| 2014/0027436 A1 | 1/2014 | Cornelius |
| 2014/0033409 A1 | 2/2014 | O'Malley et al. |
| 2014/0098424 A1 | 4/2014 | Jannard |
| 2014/0104566 A1 | 4/2014 | Kokonaski et al. |
| 2014/0160424 A1 | 6/2014 | Benko et al. |
| 2014/0168784 A1 | 6/2014 | Hiraki |
| 2014/0237709 A1 | 8/2014 | McCulloch et al. |
| 2014/0253868 A1 | 9/2014 | Jannard |
| 2014/0267645 A1 | 9/2014 | Wexler et al. |
| 2014/0267648 A1 | 9/2014 | Wexler et al. |
| 2014/0268016 A1 | 9/2014 | Chow et al. |
| 2014/0268017 A1 | 9/2014 | Sweis |
| 2014/0270244 A1 | 9/2014 | Fan |
| 2014/0270316 A1 | 9/2014 | Fan |
| 2014/0290054 A1 | 10/2014 | Etzkorn |
| 2014/0293215 A1 | 10/2014 | Blum et al. |
| 2014/0303687 A1 | 10/2014 | Wall et al. |
| 2014/0317836 A1 | 10/2014 | McCulloch et al. |
| 2014/0329519 A1 | 11/2014 | Warren |
| 2014/0374402 A1 | 12/2014 | Cornelius et al. |
| 2015/0053067 A1 | 2/2015 | Goldstein |
| 2015/0061837 A1 | 3/2015 | Honoré et al. |
| 2015/0062469 A1 | 3/2015 | Fleury |
| 2015/0116655 A1 | 4/2015 | Jannard |
| 2015/0177521 A1* | 6/2015 | Abdollahi ............ G02B 27/017 345/8 |
| 2016/0004103 A1 | 1/2016 | Reyes |

FOREIGN PATENT DOCUMENTS

| | | |
|---|---|---|
| CN | 2108942 | 7/1992 |
| CN | 1234895 A | 11/1999 |
| CN | 2583696 Y | 10/2003 |
| CN | 1687817 A | 10/2005 |
| CN | 2735373 Y | 10/2005 |
| CN | 2760600 Y | 2/2006 |
| CN | 201097024 Y | 8/2008 |
| CN | 201637963 U | 11/2010 |
| CN | 202583631 U | 12/2012 |
| CN | 103207463 A | 7/2013 |
| CN | 203084359 U | 7/2013 |
| CN | 103263109 A | 8/2013 |
| CN | 103293712 A | 9/2013 |
| CN | 203204263 U | 9/2013 |
| CN | 203217195 U | 9/2013 |
| CN | 203217199 U | 9/2013 |
| CN | 203275813 U | 11/2013 |
| CN | 103957346 A | 7/2014 |
| DE | 831 747 C | 2/1952 |
| DE | 197 04 063 A1 | 2/1999 |
| DE | 299 01 673 U1 | 2/1999 |
| DE | 20 2004 004 378 | 8/2004 |
| DE | 20 2006 004 294 | 7/2006 |
| DE | 10 2005 054 317 | 5/2007 |
| EP | 0 840 465 | 5/1998 |
| EP | 1 544 665 | 6/2005 |
| EP | 2 169 444 | 3/2010 |
| ES | 2 299 399 | 5/2008 |
| FR | 929 851 | 1/1948 |
| FR | 1 160 007 | 7/1958 |
| FR | 1 444 945 | 10/1966 |
| FR | 2 157 260 | 6/1973 |
| FR | 2 642 856 | 8/1990 |
| FR | 2 789 499 | 8/2000 |
| FR | 2 820 936 | 8/2002 |
| GB | 497 375 | 12/1938 |
| GB | 723 981 | 2/1955 |
| GB | 2 362 474 A | 11/2001 |
| GB | 2 401 772 A | 11/2004 |
| IT | 00235504 | 4/2000 |
| JP | 42-022998 | 11/1942 |
| JP | 58-26282 | 2/1983 |
| JP | 58-113912 A | 7/1983 |
| JP | 58-113914 A | 7/1983 |
| JP | 62-005024 | 1/1987 |
| JP | 02-121661 A | 5/1990 |
| JP | 03-027014 A | 2/1991 |
| JP | 04-023579 A | 1/1992 |
| JP | 04-086642 A | 3/1992 |
| JP | 08-009483 A | 1/1996 |
| JP | 08-036143 | 2/1996 |
| JP | 10-513021 | 12/1998 |

(56) References Cited

FOREIGN PATENT DOCUMENTS

| | | |
|---|---|---|
| JP | 11-353444 | 12/1999 |
| JP | 2001 170103 A | 6/2001 |
| JP | 2001-522063 | 11/2001 |
| JP | 2002-085444 | 3/2002 |
| JP | 2002 252075 A | 9/2002 |
| JP | 2003-189398 | 7/2003 |
| JP | 2005-086522 A | 3/2005 |
| JP | 2007-148131 | 6/2007 |
| JP | 2008-545287 A | 12/2008 |
| JP | 2011-180414 A | 9/2011 |
| JP | 3171527 | 10/2011 |
| WO | WO 96/23373 | 8/1996 |
| WO | WO 97/25790 | 7/1997 |
| WO | WO 97/33270 | 9/1997 |
| WO | WO 99/23524 | 5/1999 |
| WO | WO 99/50706 | 10/1999 |
| WO | WO 00/65803 | 11/2000 |
| WO | WO 00/70390 | 11/2000 |
| WO | WO 00/70779 | 11/2000 |
| WO | WO 00/79329 | 12/2000 |
| WO | WO 00/79333 | 12/2000 |
| WO | WO 01/06298 | 1/2001 |
| WO | WO 01/95018 | 12/2001 |
| WO | WO 02/065198 | 8/2002 |
| WO | WO 03/067585 | 8/2003 |
| WO | WO 03/071830 | 8/2003 |
| WO | WO 2004/012477 | 2/2004 |
| WO | WO 2005/050288 | 6/2005 |
| WO | WO 2006/055884 | 5/2006 |
| WO | WO 2006/086699 | 8/2006 |
| WO | WO 2006/120416 | 11/2006 |
| WO | WO 2007/068808 | 6/2007 |
| WO | WO 2008/076774 | 6/2008 |
| WO | WO 2008/082718 | 7/2008 |
| WO | WO 2010/098902 | 9/2010 |
| WO | WO 2013/019893 | 2/2013 |
| WO | WO 2013/027752 | 2/2013 |
| WO | WO 2013/059257 | 4/2013 |
| WO | WO 2013/078442 | 5/2013 |
| WO | WO 2013/123262 | 8/2013 |
| WO | WO 2013/123264 | 8/2013 |
| WO | WO 2014/070770 | 5/2014 |
| WO | WO 2014/149631 | 9/2014 |
| WO | WO 2014/201213 | 12/2014 |
| WO | WO 2015/048564 | 4/2015 |

OTHER PUBLICATIONS

Alderton, Megan: "The Bluetooth Question", RF Design. Jan. 1, 2001.
Bluetooth Specification Version 1.1, Feb. 22, 2001, pp. 1-452.
Borriello, Gaetano: "Survey on Information Appliances", Computer Society, 2002. http://www.computer.org/cga/articles/infoappli.htm, Oct. 8, 2003.
Complaint for Patent and Tradedress Infringement; U.S. District Court—Central District of California; Case No. SA-CV-07-1184 AHS (Anx); Oakley, Inc. v. Audio Visual Allstar dba AVAsunglasses. com; Filed Oct. 4, 2007; this lawsuit is settled and dismissed.
Complaint for Patent Infringement U.S. District—Central District of California; Case No. SACV 06-899 JVS (MLGx); Oakley, Inc. v. Xonix Electronics Co., Ltd., filed Sep. 26, 2006; this lawsuit has been dismissed.
Complaint for Patent Infringement; U.S. District—Central District of California; Case No. 03-6284 (GAF)(FMOx); QR Spex, Inc. and Thomas G. Swab v. Motorola, Inc. and Frog Design, Inc.; filed Sep. 3, 2003; this lawsuit was transferred to the Central District of California from the Eastern District of Texas and was dismissed.
Complaint for Patent Infringement; U.S. District Court—Central District of California, Southern Division; Case No. SACV 07-558 AG (RNBx); Oakley, Inc. v. Practical Enterprises, Inc., filed May 16, 2007; this lawsuit was settled and dismissed.
Complaint for Patent Infringement; U.S. District Court—Central District of California, Southern Division; Case No. SACV 07-57 DOC (Anx); Oakley, Inc. v. Blue Diamond International, filed Jan. 16, 2007; this lawsuit resulted in a default judgment.
Complaint for Patent Infringement; U.S. District Court—Central District of California, Southern Division; Case No. SACV 07-671 AG (RNBx); Oakley, Inc. v. XONIX (Zhuhai) Electronics Co., Ltd. et al., filed Jun. 7, 2007; this lawsuit was settled and dismissed.
Complaint for Patent Infringement; U.S. District Court—Central District of California, Southern Division; Case No. SACV 07-888 CJC (RCx); Oakley, Inc. v. The Pep Boys Manny Moe & Jack of California, Inc., filed Aug. 1, 2007; this lawsuit is settled and dismissed.
Complaint for Patent Infringement; U.S. District Court—Central District of California; Case No. 07-CV-1153 AHS (PJWx); Oakley, Inc. v. Zeal Optics, Inc.; filed Sep. 28, 2007; this lawsuit was dismissed.
Complaint of Patent Infringement; U.S. District Court—Central District of California; Case No. SACV 09-00062 JVS (Anx); Oakley, Inc. v. Spencer Gifts, LLC.: filed Jan. 14, 2009; this lawsuit was settled and dismissed.
De Herrera, Chris: "The Future of the Pocket PC", Pocket PC Magazine, 2003. http://www.pocketpcmag.com/ Mar02/future.asp, Oct. 8, 2003.
Decision Dismissing Request to Strike Detailed Request for Reexamination, received Jun. 11, 2009 in Reexam U.S. Appl. No. 90/009,088, 5 pages.
Defendant Motorola, Inc.'s Responses to Plaintiffs' First Set of Interrogatories; U.S. District Court—Central District of California; Case No. CV 03-6284 JFW (FMOx); QR Spex, Inc. and Thomas G. Swab v. Motorola, Inc. and Frog Design, Inc.; dated Apr. 26, 2004; this lawsuit was transferred to the Central District of California from the Eastern District of Texas and was dismissed.
Defendant's Preliminary Invalidity Contentions re U.S. Pat. No. 7,331,666 and Addendum, U.S. District Court—Eastern District of Texas; Case No. 5:06CV124; U.S. District Court—Central District of California; Case No. SACV 06-627 CJC (RNBx); QR Spex, Inc. v. Oakley, Inc., Oakley Sales Corp., Oakley Direct, Inc., and Motorola, Inc.; filed Nov. 3, 2008; this lawsuit was consolidated and dismissed.
Defendants' Preliminary Invalidity Contentions re U.S. Pat. No. 6,769,767, including Exhibit, U.S. District Court—Eastern District of Texas; Case No. 5 :06CV124; U.S. District Court Central District of California; Case No. SACV 06-627 CJC (RNBx); QR Spex, Inc. v. Oakley, Inc., Oakley Sales Corp., Oakley Direct, Inc., and Motorola, Inc.; filed Jun. 16, 2008; this lawsuit is consolidated and dismissed.
Determination of Decision Granting Ex Parte Reexamination, received in Reexam U.S. Appl. No. 90/009,088, Jun. 12, 2008, 14 pages.
Determination of Decision Granting Ex Parte Reexamination, received in Reexam U.S. Appl. No. 90/009,112, Jun. 16, 2008, 14 pages.
DeVaul et al.: "The Memoray Glasses: Subliminal vs. Overt Memory Support with Imperfect Information", 2002.
DeVaul, Richard W.: "The Memory Glasses Project", MIThril Media Lab, Oct. 28, 2003. http://www.media.mit.edu/wearables/ mithril/memory-glasses.html.
Dorfman, Marjorie: "Wearable Technology: La Computer Mobile", Byte Back Online, 2003. http://www.bytebackonline.com/Articles_ p/wearcomp_p.html, ct. 8, 2003.
Dresang, Joel: "Finns Fluent in Language of Cell Phones", JSOnline—Milwaukee Journal Sentinel, Apr. 15, 2000. http://www. isonline.com/bym/news/apr00/phone16041500a.asp?format=print. Accessed on Aug. 23, 2004.
Dressing in Digital Attire, Consumer Electronics Association— Vision, Nov./Dec. 2001. http://www.ce.org/publications/vision/ 2001/novdec/p08.asp?bc=cat&category_id=39. Dec. 5, 2003.
"Fashionable Eyewear Charms to add Color, Style & Fun to Eyeglass Frams", Ficklets—Eyewear Charm Huggers. http://www. ficklets.com. Jul. 22, 2009.
First Amended Complaint and Application for Permanent Injunction; U.S. District Court—Eastern District of Texas (Texarkana

(56) References Cited

OTHER PUBLICATIONS

Division); Civil Action No. 506 CV 124; *QR Spex, Inc. v. Motorola, Inc.; Oakley, Inc.; Oakley Sales Corp.; Oakley Direct Inc.; Zeal Optics, Inc.; Xonix Electronic Co., Ltd; and Kyocera Wireless Corp.*, filed Jul. 27, 2006; this lawsuit was transferred to the Central District of California from Eastern District of Texas and was dismissed.
First Amended Complaint for Patent Infringement; U.S. District—Central District of California; Case No. SACV 06-244 AHS (MLGx); *Oakley, Inc. v. Overstock.com, Inc., Wootcom, Inc. dba Synapse Micro, Inc., Global American Technologies, LLC., Aigo, Corp.*, filed Mar. 27, 2006; this lawsuit has been settled in part and dismissed.
First Amended Complaint for Patent Infringement; U.S. District Court—Central District of California; Case No. SACV 05-1099 AHS (MLGx); *Oakley, Inc. v. BMW of North America, LLC.*, filed Nov. 28, 2005; this lawsuit has been settled and dismissed.
Franklin, Curt: How Bluetooth Works from www.howstuffworks.com, web site visited on Jun. 11, 2002.
Frog Design and Motorola Launch Prototypes of Next Generation of Wearable Wireless Solutions, Frog Design.com, 2003. http://www.frogdesign.com/company/news_press/press_releases/2003/pro046.html. Apr. 5, 2004.
Furan, Amy. "Computing on the Go", Techies.com, http://home.techies.com/Common/Career/2 .Nerge060 100_m.js. Oct. 8, 2003.
Hands-Free Profile (HFP), Oct. 22, 2001, 71 pages.
Hattori, James: "Bluetooth Developers Aim to Usher in a Wireless Era", CNN.com-Technology-Computing. Sep. 1, 2000. http://cnn.com.
Headset Profile from Bluetooth Specification Version 1.1, Feb. 22, 2001, pp. 198-224.
Hieb, Barry MD. "The Electronic Age: The Future of Wearables", Advance Newsmagazine—for Nurse Practitioners, Mar. 5, 2001. http://www.advancefornp.com/common/editorial/PrintFriendly.aspx?CC~2160. Mar. 17, 2004.
International Search Report and Written Opinion, re PCT Application No. PCT/US2010/021044, issued Apr. 13, 2010 in 9 pages. 16.
International Invitation to Pay and Search Report, re PCT Application No. PCT/US2014/042066, mailed Sep. 5, 2014.
International Search Report, re PCT Application No. PCT/US01/17540, mailed Oct. 26, 2001.
Invisible Eyewear Micro Display, The MicroOptical Corporation, Pre-2007 publication.
Kleinman, Neil. "Wearable Wear-Wearable computing in jewelry?", Pen Computing-Covering Mobile Computing and Communications. Issue 39, May 2001. http://www.pencomputing.com/wearableware/column39.htrnl. Mar. 17, 2004.
Mann, Steve. "Wearable Computing: A First Step Toward Personal Imaging", Computer-Cybersquare, vol. 30, No. 2, Feb. 1997. http://wearcam.org/ieeecomputer/r2025.htm.
McKay, Niall. "You are What You Wear", The Feature.com, Aug. 7, 2000. http://www.thefeature.com/article?articleid=I223. Oct. 8, 2003.
Moran, John M. "Wrist Phones Step Out of the Comic Page", Chicago Tribune Online, Oct. 19, 2000. http://www.chica .. ./sns-ebiz-wireless101900wrist,0,3250718.stor. Oct. 8, 2003.
Motorola Bluetooth Wireless Headset User Guide, 2001, 27 pages.
Motorola Consumer Catalog for Phone Accessories from www.commerce.motorola.com,web site visited on Jun. 13, 2002.
Notice of Intent to Issue Ex Parte Reexamination Certificate, in Reexam U.S. Appl. No. 90/009,088, 10 pages.
Notice of Intent to Issue Ex Parte Reexamination Certificate, in Reexam U.S. Appl. No. 90/009,112, 11 pages.
OEM Developer Kits—DV-1 Wireless Digital Viewer, The MicroOptical Corporation—Making Portable Practical 2004. http://www.microopticalcorp.com/OEM/kitDV-1.html. Accessed on Apr. 20, 2004.
Office Action (Petition Decision Denying Request to Vacate as Non-Compliant) received in Reexam U.S. Appl. No. 90/009,088, mailed Mar. 11, 2009, 16 pages.

Office Action (Petition Decision Denying Request to Vacate as Non-Compliant) received in Reexam U.S. Appl. No. 90/009,112, mailed Mar. 11, 2009, 26 pages.
Patent Owner's Statement under 37 CFR. § 1.530, filed in Reexam U.S. Appl. No. 90/009,088, Aug. 12, 2008, 4 pages.
Patent Owner's Statement under 37 CFR. § 1.530, filed in Reexam U.S. Appl. No. 90/009,112, Aug. 13, 2008, 5 pages.
Pentland, Alex Sandy. "Wearable Information Devices", MIT Media Laboratory, pp. 12-67, 2001.
Petition Decision Denying Request to Vacate as Non-Compliant [37 CFR 1.181(a)&C], received in Reexam U.S. Appl. No. 90/009,112, Mar. 11,2009, 5 pages.
Petition Decision Denying Request to Vacate as Non-Compliant [37 CFR 1.181(a)&C], received in Reexam U.S. Appl. No. 90/009,088, Jun. 11, 2009, 5 pages.
Petition under 37 CFR. 1.182 to Strike Detailed Request for Reexamination due to Non-Compliance with at Least MPEP 2205, filed in Reexam U.S. Appl. No. 90/009,088, Aug. 12, 2008, 4 pages.
Petition under 37 CFR. 1.182 to Strike Detailed Request for Reexamination due to Non-Compliance with at Least MPEP 2205, filed in Reexam U.S. Appl. No. 90/009,112, Aug. 13, 2008, 4 pages.
Piller, Charles. "Internet Guru's Theory of Evolution", LA Times.com, Apr. 3, 2000. http://latimes.com/print/business/20000403/t000031121.html, Oct. 8, 2003.
Piller, Charles: "Connecting the World through Internet Appliances", Patrickweb.com, Apr. 9, 2000, http://www.patrickweb.com/pages/int /appliances_iws2000.htm. Oct. 8, 2003.
Plaintiffs' Response to Defendant Motorola, Inc.'s First Set of Request for Admission; U.S. District Court—Central District of California; Case No. CV 03-6284 JFW (FMOx); *QR Spex, Inc. and Thomas G. Swab v. Motorola, Inc. and Frog Design, Inc.;* dated Mar. 12, 2004; this lawsuit was transferred to the Central District of California from the Eastern District of Texas and was dismissed.
Plaintiffs' Response to Defendant Motorola, Inc.'s First Set of Special Interrogatories; U.S. District Court—Central District of California; Case No. CV 03-6284 JFW (FMOx); *QR Spex, Inc. and Thomas G. Swab v. Motorola, Inc. and Frog Design, Inc.;* dated Mar. 12, 2004; this lawsuit was transferred to the Central District of California from the Eastern District of Texas and was dismissed.
Plaintiffs' Supplemental Response to Defendant Motorola, Inc.'s First Set of Interrogatories; U.S. District Court—Central District of California; Case No. CV 03-6284 JFW (FMOx); *QR Spex, Inc. and Thomas G. Swab v. Motorola, Inc. and Frog Design, Inc.;* dated May 18, 2004; this lawsuit was transferred to the Central District of California from the Eastern District of Texas and was dismissed.
Receipt of Original Ex Parte Request by Third Party, Filed in Reexam U.S. Appl. No. 90/009,088, Mar. 20, 2008, 60 pages.
Receipt of Original Ex Parte Request by Third Party, Filed in Reexam U.S. Appl. No. 90/009,112, Apr. 16, 2008, 75 pages.
Reexam Litigation Search conducted in Reexam U.S. Appl. No. 90/009,112, Jul. 1, 2009, 19 pages.
Reexam Litigation Search conducted in Reexam U.S. Appl. No. 90/009,112, Jun. 9, 2008, 14 pages.
Reexam Litigation Search conducted in Reexam U.S. Appl. No. 90/009,112, Mar. 4, 2009, 14 pages.
Reexam Litigation Search conducted in Reexam U.S. Appl. No. 90/099,088, Apr. 9, 2008, 30 pages.
Reexam Litigation Search conducted in Reexam U.S. Appl. No. 90/099,088, Jun. 30, 2009, 19 pages.
Reexam Litigation Search conducted in Reexam U.S. Appl. No. 90/099,088, Mar. 4, 2009, 11 pages.
Reply Memorandum of Points and Authorities in Support of Defendant Motorola, Inc.'s Motion for Summary Judgment; U.S. District Court—Central District of California; Case No. CV 03-6284 JFW (FMOx); *QR Spex, Inc. and Thomas G. Swab v. Motorola, Inc. and Frog Design, Inc.;* filed Jun. 7, 2004; this lawsuit was transferred to the Central District of California from the Eastern District of Texas and was dismissed.
Robbins, Alexandra. "A Display in Your Glasses", PC Magazine—The Independent Guide to Technology. Nov. 12, 2002. http://www.pcmag.com/article2/0,4149,667638,00.asp. Accessed on Dec. 5, 2003.

(56) References Cited

OTHER PUBLICATIONS

See What You're Missing—Electronic Images/data are Superimposed Over Your View of the World, Advertisements. The MicroOptical Corporation, Pre-1999 Publication.
Shivers, Olin. "BodyTalk and the BodyNet: A Personal Information Infrastructure", Massachusetts Institute of Technology, Laboratory for Computer Science-Personal Information Architecture Note 1, Dec. 1, 1993.
Special Product Review "ID Magazine", Aug. 2002, p. 179.
Spitzer, Mark B. "The Wristwatch: the bellwether for personal technology", Technology Reports.net, Mar. 26, 2003, http://technologyreports.netlnextinnovatorl?articleID=1636. Accessed on Oct. 8, 2003.
Star Trek Deep Space Nine, "A Time to Stand," Sep. 29, 1997 [ retrieved on Jul. 23, 2014]. Retrieved from the internet: <URL:http:www.cbs.com/shows/star_trek_deep_space_nine/video/O6sNiuXkHru5xXgETAISgA3YAguijIVLu/a-time-to-stand/>; minute marks 27:54, 33:17.
Stevens, Cindy Loftier. "A Glimpse into the Digital Future", Consumer Electronics, Mar./Apr. 2000, http://www.ce.org/publications/vision.. .lpg21.asp?category id=3. Accessed on Oct. 8, 2003.
Stipulation and Amend Pleadings in Consolidated Cases Transferred from Eastern District of Texas; U.S. District Court—Central District of California, Southern Division; Case No. 07CV-00987 CJC (RNBx); *QR Spex, Inc.* v. *Motorola, Inc. et al.;* filed Sep. 5, 2007; this lawsuit was transferred to the Central District of California from the Eastern District of Texas and was dismissed.
Substance and Style, by Motorola and Frog Design, Motorola. Time Nov. 17, 2003.
Summons for Complaint for Patent Infringement; U.S. District Court—Central District of California; Case No. CV 09-624 CAS (JWJx); *Oakley, Inc.* v. *Digitalrise, LLC.;* filed Jan. 27, 2009; a default judgment was ordered.
The Ultimate Device, Accenture, Nov. 7, 2000. http://www.accenture.com/xd.asp?it=enWeb &xd=Services%5CTechnology%Ctech_ultimate.html. Accessed on Oct. 8, 2003.
Theil, Stefan. "Love Those Wearables!", Newsweek, Apr. 9, 2001. http://nl.newsbank.com/nl-search/we/Archives?p_action~doc&p_docid=0EC05F8D8A26. Apr. 15, 2004.
Turoff. "Wearable Computers", Fall 1999 Semester, Course CIS732, Dec. 16, 1999. http://eies.njit.edu/-turoff/coursenotes/CIS732/sa. . /brian_732.html. Oct. 8, 2003.
UDRI Researchers Develop Glasses-mounted Display, Next Generation of Wearable Computers, University of Dayton. Feb. 29, 2000. http://www.udayton.edu/news/nr/022900a.html. Accessed on Dec. 5, 2003.
Video glasses come close to melding fantasy, reality, USA Today—Marketplace. http://www.usatoday.com/tech/news/techinnovations/2002-09-23-glasses_x.htm. Accessed on Dec. 5, 2003.
Wave Report, The Wave Report on Digital Media, Nov. 20, 2000. http://www.wave-report.com/2000%20Wave%20Issues/wave2055.htm, Accessed on Mar. 17, 2004.
Wearable Computing, Georgia Institute of Technology, 2003. http://www.gatech.edu/innovations/wearablecomputing. Oct. 8, 2003.
Weiss, Peter. "Minding Your Business", Science News Online, Week of May 3, 2003,vol. 16. http://www.sciencenews.org/20030503/bob8.asp. Accessed on Oct. 8, 2003.
Willett, Edward. "Best of Popular Science's What's New: 1999", Edward Willett's Science Columns, 1999. http://www.edwardwillett.com/Columns/popscienceawards99.htm. Accessed on Oct. 8, 2003.
International Search Report and Written Opinion, re PCT Application No. PCT/US2014/042066, mailed Nov. 11, 2014.

\* cited by examiner

MODULAR HEADS-UP DISPLAY SYSTEM

CROSS-REFERENCE TO RELATED APPLICATIONS

This application is a continuation of International Application No. PCT/US2014/042066, designating the United States, with an international filing date of Jun. 12, 2014, which claims priority to U.S. Provisional Application No. 61/834,082, filed Jun. 12, 2013, the entireties of each of which are incorporated herein by reference.

BACKGROUND

Field

This disclosure relates generally to communication eyewear, and specifically to communication eyewear used in transmitting and/or conveying visual information to or from a wearer.

Description of the Related Art

There are many types of eyewear with different functional and aesthetic purposes. For example, some users require eyewear to correct physiological deficiencies in their vision; some eyewear helps to diminish the amount of light or alter the spectral profile of light entering a user's eyes; and some eyewear protects a user's eyes from damaging contact with objects or debris. Many users have strong preferences regarding the aesthetic appearance of their eyewear.

Electronic communication eyewear can require elaborate and expensive components and systems to enable highly sophisticated functional communication features, which can be very expensive to design, manufacture, and purchase. There are not many options available to purchasers of electronic communication eyewear regarding the basic optical, protective, and aesthetic features of such electronic communication eyewear.

SUMMARY

In some embodiments, a modular electronic communication system is provided with interchangeable components attachable on eyewear. A plurality of pre-existing eyewear models can each be retrofitted by attachment of one or more of such interchangeable components to that eyewear. One or more of such components can be configured for custom attachment with a particular eyewear and one or more other of such components can be configured for universal attachment with one or more different eyewear models. The communication system can be configured to produce an adjustable heads-up display for the wearer of the eyewear. The electronic communication system can comprise a plurality of interchangeable, electronically interconnected components, such as a first optical module, a first base module, a base link, a second base module, and/or a second optical module. In some embodiments, one or more or all of the components of the electronic communication system are integrally and permanently attached to an eyewear and are not interchangeable or modular.

DETAILED DESCRIPTION

Some embodiments of the inventions will now be described with reference to the accompanying figures, wherein like numerals refer to like or similar elements throughout. Although several embodiments, examples and illustrations are disclosed below, it will be understood by those of ordinary skill in the art that the inventions described herein extend beyond the specifically disclosed embodiments, examples and illustrations, and can include other uses of the inventions and modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Figure 1:
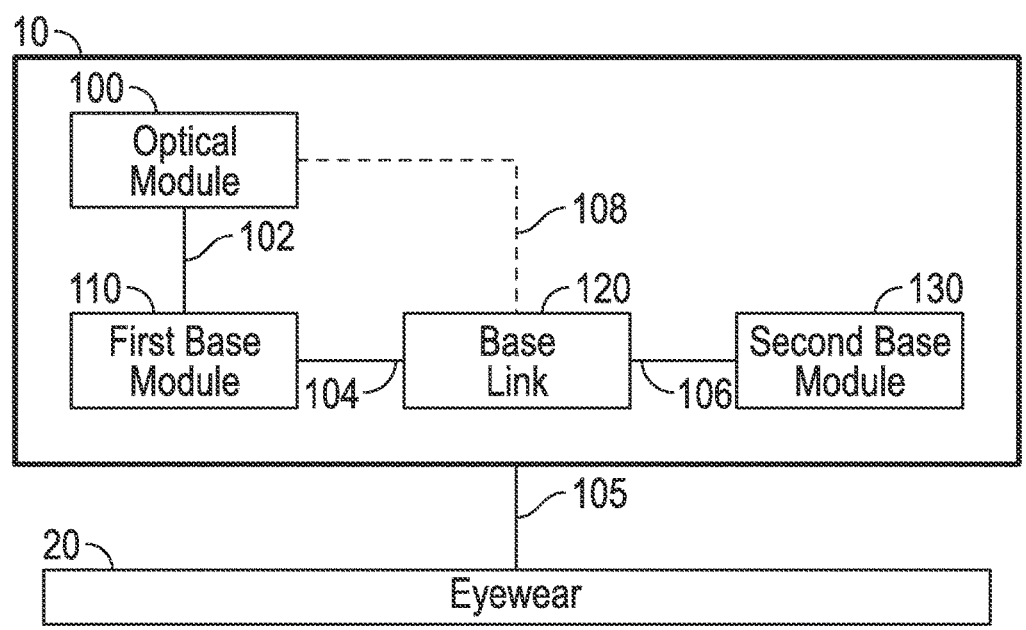
FIG. 1 is a schematic diagram of a communication system for eyewear.

FIG. 1 illustrates an example of an interconnected communication system 10 for obtaining information, processing information, and/or conveying information to a user of eyewear 20. In some embodiments, the system 10 can be removably attachable to eyewear 20 and can comprise one or more modules and a base link to which one or more of the modules removably attach. In some embodiments, as illustrated, the system 10 can comprise an optical module 100 which can include an optical element, a first base module 110, a second base module 130, and a base link 120 (such as a mount for another component or a connection between two or more components), to which one or more of the first base module 110, the second base module 130, and/or the optical module 100 can be attached. In some embodiments, the base link 120 can be configured to attach or mechanically link one or more modules, such as the first base module 110, the second base module 130, and/or the optical module 100 to the eyewear 20. In some but not all embodiments, the base link 120 can be configured to convey power and/or information, such as via an electronic link, between the first and second base modules 110, 130 as well as the optical module 100. In some but not all embodiments, the base link 120 can be configured to attach to the first base module 110, the second base module 130, and/or the optical module 100 without conveying information and/or power between or among one or more of the modules 100, 110, 130.

The system 10 can have a functional and/or mechanical connection with the eyewear 20. In some embodiments, eyewear 20 can be pre-existing eyewear (see, e.g., eyewear 240 illustrated in FIG. 2, eyewear 540 illustrated in FIG. 4, eyewear 640 illustrated in FIG. 5), which is not necessarily designed with or provided with integrated communication functionality or a heads-up display as sold to a consumer. Pre-existing eyewear 20 can be retrofitted by attachment of system 10 onto it. In some embodiments, one or more or all of the components, structures, and/or functions of one or more of the communication systems disclosed herein can be integrated into and permanently attached to eyewear 20 as sold to a consumer.

In some embodiments, one or more of the system components 100, 110, 120, 130 can be configured to be modular. For example, one or more of the system components 100, 110, 120, 130 can be configured to be rapidly and easily spatially separable from and/or joinable with one or more of the other system components 100, 110, 120, 130 by a user of the eyewear 20 while the outer housing or outer surfaces of each system component generally remain intact and/or without requiring the use of tools or the removal of adherent structures such as adhesive or solder. One or more of the particular system components 100, 110, 120, 130 can be interchangeably removed and replaced with a corresponding type of such system component 100, 110, 120, 130.

The interchangeable modular system components can have different shapes, appearances, features, and/or functionality, but the replacement component can include generally the same mechanical and/or electric connector or connectors as the component being replaced to enable interchangeability. In some embodiments, a vendor can provide a selection (simultaneously or over time) of a plurality of different interchangeable module system components 100, 110, 120, 130 with multiple different shapes, sizes, and/or colors, and/or with different functionality. For example, a vendor can provide a selection of a plurality of different interchangeable first base members 100 and/or a plurality of different interchangeable optical modules 100 and/or a plurality of different interchangeable second base members 120 and/or a plurality of different interchangeable base links 120, each with different shapes, sizes, and/or functional capabilities. In this way, a user can purchase different modular components to customize his or her communication system, to upgrade his or her communication system, to replace broken or damaged components in his or her communication system, and/or to allow a previously purchased communication system that closely fits and functions with one particular type of eyewear 20 to be customized to be used with and closely fit a different type of eyewear 20, by replacing only one modular communication component and/or without requiring replacement of all of the modular communication components of the communication system 10.

The optical module 100 can comprise a system for conveying information to a user of eyewear 20. In some embodiments, the optical module 100 can comprise a retinal projector configured to project a visual image directly onto the retina of a user of eyewear 20 and/or a display configured to produce an image on a small onboard screen viewable by a user of eyewear 20. The optical module 100 can comprise one or more additional components for obtaining or conveying information, such as a camera, a microphone, or a speaker. In some embodiments, one or more of these additional components can be included on a separate module, such as first or second base module 110, 130. The additional components on separate modules can be directly attached to the optical module 100 or attached to any other module of the communication system 10. In some embodiments, the optical module 100 can be modularly removably attachable to the first base module 110 or to the base link 120.

In some embodiments, the first base module 110 can comprise a base for removably attaching with and supporting the optical module 100. The first base module 110 can be configured to be attachable to a generally lateral region or a generally lower region (such as along a lower edge of a portion of a lens or a portion of a mount or orbital of a lens) of eyewear 20, or to another component of the communication system 10, such as the base link 120, which can in turn be attachable to a region of eyewear 20. In some embodiments, the first base module 110, or the base link 120 itself, can comprise a housing that supports or contains one or more electronic components, such as a transmitter, a receiver, a transceiver, a battery such as a rechargeable battery or other power source, a processor, a memory, a global positioning satellite (GPS) receiver system (e.g., configured to determine location, speed, and/or routing, etc.), audiovisual electronic components such as a speaker, a microphone, a camera, and any other audiovisual electronic components, an environmental sensor such as a temperature sensor, a pressure sensor, an altitude sensor, an oxygen sensor, a light sensor and/or any other environmental sensor, a velocity sensor such as a fluid flow sensor or pitot tube, an accelerometer, a physiological sensor such as a heartbeat sensor, a blood-oxygen sensor, a perspiration sensor, an electrolyte sensor, a body temperature sensor, and/or any other sensor as desired, and/or a user interface. The connection between the optical module 100 and the first base module 110 can be modular.

In some embodiments, the spatial relationship between the first base module 110 and the optical module 100 can be adjustable even while the first base module 110 and the optical module 100 are connected. For example, the orientation of the optical module 100 with respect to the first base module 110 can be changed or adjusted, and/or the overall distance from a first side of the base module 110 to an opposing distal side of the optical module 100 can be changed or adjusted.

The second base module 130 can be configured to be attachable to a generally lateral region of eyewear 20 or the base link 120 that is generally opposite from the attachment region for the first base module 110 on the eyewear 20 or the base link 120. The second base module 130 in some embodiments can comprise one or more electronic components, such as a transmitter, a receiver, a transceiver, a battery such as a rechargeable battery or other power source, a processor, a memory, a global positioning satellite (GPS) receiver system (e.g., configured to determine location, speed, and/or routing, etc.), audiovisual electronic components such as a speaker, a microphone, a camera, and any other audiovisual electronic, an environmental sensor such as a temperature sensor, a pressure sensor, an altitude sensor, an oxygen sensor, a light sensor and/or any other environmental sensor, a velocity sensor such as a fluid flow sensor or pitot tube, an accelerometer, a physiological sensor such as a heartbeat sensor, a blood-oxygen sensor, a perspiration sensor, an electrolyte sensor, a body temperature sensor, and/or any other sensor as desired, and/or a user interface. The weight of the second base module 130 can be approximately the same as or generally equivalent to the weight of the first base module 110 or the weight of the first base module 110 plus the weight of the optical module 100, so that when the communication system is attached to eyewear 20, the weight contribution of the communication system is generally laterally balanced. In some embodiments, the second base module 130 can be configured to be removably attachable to and/or support a second optical module (not illustrated). The second optical module can comprise any or all of the features or structure of the first optical module 100. When a second optical module is employed, the weight of the first base module 110 plus the first optical module 100 can be generally the same as or equivalent to the weight of the second base module 130 plus the second optical module.

In some embodiments, one or more additional base modules can be attached to base link 120 instead of or in addition to the first and/or second base modules 110, 130. For example, a base module can be attached at a central region of the eyewear, such as at or about the nose bridge of the eyewear 20. Any base module, whether used singly by itself or with one or more other modules, in some embodiments can comprise one or more electronic components, such as any those described in this specification corresponding to first and second base modules 110, 130.

A single base module can be attached to the base link 120, without requiring and/or without permitting attachment to another base module. The single base module can be attached to any location on the base link 120 including a generally lateral region of the eyewear 20, a generally lower region (e.g., a bottom edge), and/or a central region of the eyewear 20, such as at or about the nose bridge of the eyewear 20. Attachment at a central region of the eyewear 20, particularly when a single base module is used, can advantageously generally maintain the weight balance of the eyewear 20. Such single base module in some embodiments can comprise one or more electronic components, such as any of those described in this specification corresponding to first and second base modules 110, 130.

The base link 120 in some embodiments can comprise one or more electronic components, such as any of those described in this specification corresponding to first and second base modules 110, 130.

In some embodiments, the communication system 10 can be a discrete component from the eyewear 20. The communication system 10 can be an add-on unit which is separately purchased by a user. The communication system 10 can be purchased as a kit, and/or the modules and base link 120 can each be purchased separately for customized building of the communication system 10. This can advantageously allow the user to decide, at a later time, whether the user would like to include the communication system 10 on the eyewear. If decided to do so, the user can then retrofit an existing eyewear 20 to incorporate the base link 120 such that the user can attach selected modules, such as one or more of first and second base modules 110, 130 to the eyewear 20. Moreover, this can advantageously allow the user to remove the base link 120 when the user decides to use the eyewear 20 without the communication system 10 attached thereto.

In some embodiments, the base link 120 can be configured to extend between at least two spaced-apart regions on an eyewear 20. The base link 120 can be removably attachable with and/or support either or both of the first base module 110 and the second base module 130. In some embodiments, the base link 120 can provide electronic communication between the first and second base modules 110, 130, when such modules are positioned in spaced-apart regions on an eyewear 20, and/or the base link 120 can provide electronic communication directly between the optical module 100 and either of the first or second base modules 110, 130, when the optical module 100 is positioned away from the first or second base modules 110, 130, such as when the optical module 100 is attached to the base link 120.

In some embodiments, the base link 120 can extend along at least a portion of at least one or more lenses or lens mounts (e.g., orbitals or other lens-holding structure) of an eyewear 20. For example, the base link 120 can extend along a lower edge of a unitary lens or along each lower edge of a pair of lenses in dual-lens eyewear, from a first lateral region of the eyewear to a medial region of the eyewear to a second lateral region of the eyewear that is generally opposite from the first lateral region. In some embodiments, the base link 120 can extend along at least a portion of the bottom periphery of the lens and/or lens mount of eyewear 20. The base link 120 can attach directly to the lens such that the base link 120 need not be attached to the frame and/or the earstem of the eyewear 20. In some embodiments, the base link 120 can attach to the lens, the frame, and/or the earstems of the eyewear 20. In some embodiments, the base link 120 can extend along another portion of the eyewear, such as along an upper edge or along the front frame, and/or along either or both of the earstems of the eyewear 20. In some embodiments, the base link 120 does not extend along or attach to an upper edge or upper portion of the frame and/or does not extend along or attach to an earstem. As illustrated, in some embodiments the base link 120 can be sized and shaped to closely conform with, generally, or correspond to the contours or shape of at least a portion of the eyewear 20 to provide an integrated aesthetic appearance with the eyewear 240 and/or to enable secure and firm attachment between the base link 120 and the eyewear 20.

In some embodiments, one or more connectors 105 can be located on one or more components 100, 110, 120, 130 of the communication system 10 and can be configured to help attach, either temporarily or permanently, such components to the eyewear 20. For example, one or more connectors 105 can be located on the base link 120 to enable the base link 120 to be removably attached to a region of the eyewear 20, and/or one or more connectors 105 can be located on either or both of the first and second base modules 110, 130 to enable removable attachment of either or both of such modules 110, 130 with a region of the eyewear 20. In some embodiments, one or more connectors 105 can be located on the optical module 100 to enable the optical module to be removably attached to a region of the eyewear 20.

In some embodiments, one or more components 100, 110, 120, 130 of the communication system can be removably attached to each other by one or more connectors. For example, the optical module 100 can be removably attached to the first base module 110 by a connector 102; the optical module 100 can be removably attached to base link 120 by a connector 108; the first base module 110 can be removably attached to the base link 120 by a connector 104; and/or the base link 120 can be removably attached to the second base module by a connector 106. In some embodiments, the connector 104 of the first base module 110, the connector 106 of the second base module, and/or the connector 108 of the optical module can be attached to one or more ports of the base link 120. The one or more ports of the base link 120 can provide a mechanical and/or electrical connection. In some embodiments, one or more components 100, 110, 120, 130 can include connectors for mechanically and/or electronically linking the one or more components 100, 110, 120, 130 to other components not shown herein including, but not limited to, a computer device such as a desktop computer, a mobile computer, and/or a mobile phone. This can advantageously allow for reconfiguration and/or transfer of data between the one or more components 100, 110, 120, 130 with the linked device. In some embodiments, one or more components 100, 110, 120, 130 can include connectors for mechanically and/or electronically linking the one or more components 100, 110, 120, 130 to a charging device so as to charge a battery. In some embodiments, two or more functions or features of any components disclosed and/or illustrated in this specification (e.g., 100, 110, 120, 130, etc.) can be functionally and/or mechanically fused or combined into a single component. For example, any function or feature of a base module 110, 130 can be included in the base link 120, and/or any function or feature of the base link 120 can be included in a base module 110, 130; further, any components illustrated and/or described in this specification can be permanently or semi-permanently attached to each other to form a unitary component.

The connectors 102, 104, 106 can comprise a mechanical and/or an electrical connection between one or more components. The mechanical connection can be configured to removably secure two or more components together in a manner that prevents inadvertent or unintentional separation but that permits easy disconnection when a user desires to reconfigure the communication system by removing and/or replacing components. For example, any two components 100, 110, 120, 130 can be removably secured to each other by way of selective attachment mechanisms, such as with one or more corresponding protrusions and indentations, one or more squeeze-release connections, one or more snap-fit connections, one or more screw connections, one or more biased-bearing connections, one or more friction fit connections, and/or one or more bayonet lock connections. Accordingly, in some embodiments, the mechanical connection can be designed such that a user can readily attach and remove the components without separate tools, without requiring removal of a housing of one or more of such components and/or without requiring removal of one or more adherents, such as glue or solder. Of course, in some embodiments, a tool can be provided to facilitate attachment and removal of the components.

The electrical connection can be configured to permit transmission of electrical energy between or among the components 100, 110, 120, 130 of the communication system. The electrical connection can be configured to be removably attachable in a manner that prevents inadvertent or unintentional separation but that permits easy disconnection when a user desires to reconfigure the communication system by removing and/or replacing components. The electronic connections can comprise end regions with exposed electrical conductors in or near the attachment regions of each component 100, 110, 120, 130 in a location and orientation that permits the exposed electrical conductors of one component 100, 110, 120, 130 to achieve selective electrical communication with the electrical conductors of another component 100, 110, 120, 130. In some embodiments, the corresponding electrical conductors can be selectively brought into contact in many ways, such as by abutting each other, overlapping each other, being received into or covering each other, or intermeshing with each other.

No component, structure, or feature is required, essential, or indispensable in any embodiments disclosed herein. Any component can be omitted. For example, in some embodiments, there is no base link 120, 220, 520, 620 or second base module 130, 230; or the communication system 10, 205 is not removable or capable of retrofitting attachment by a consumer; or the optical module 100, 200 is not removable from the first base module 110, 210. Any other component or structure or function illustrated in the figures or described in the text of this specification can be omitted in certain embodiments.

Figure 2A:
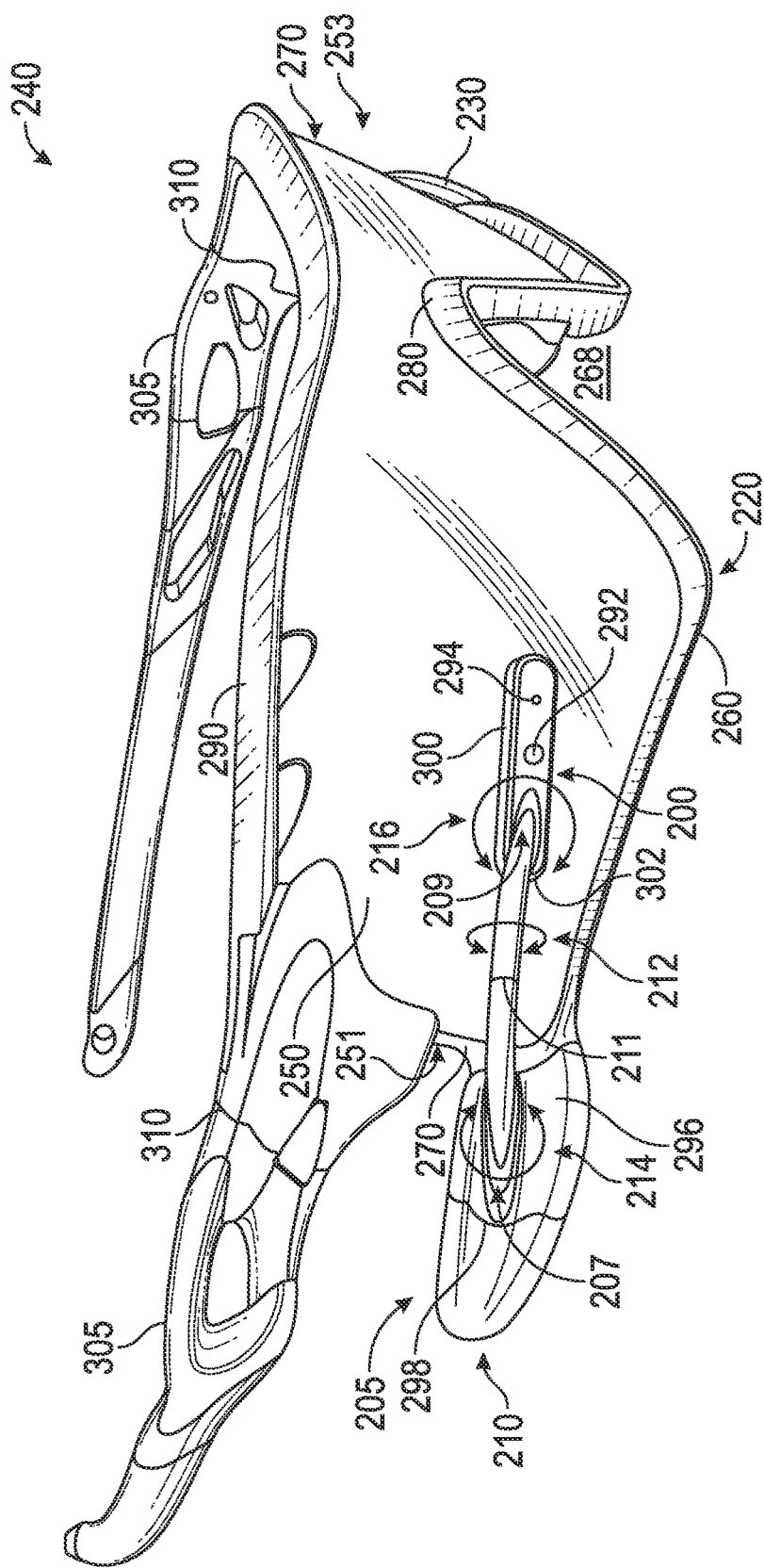
FIG. 2A is a pre-existing eyewear retrofitted with an exemplary embodiment of a modular communication system having interchangeable components.
Figure 2B:
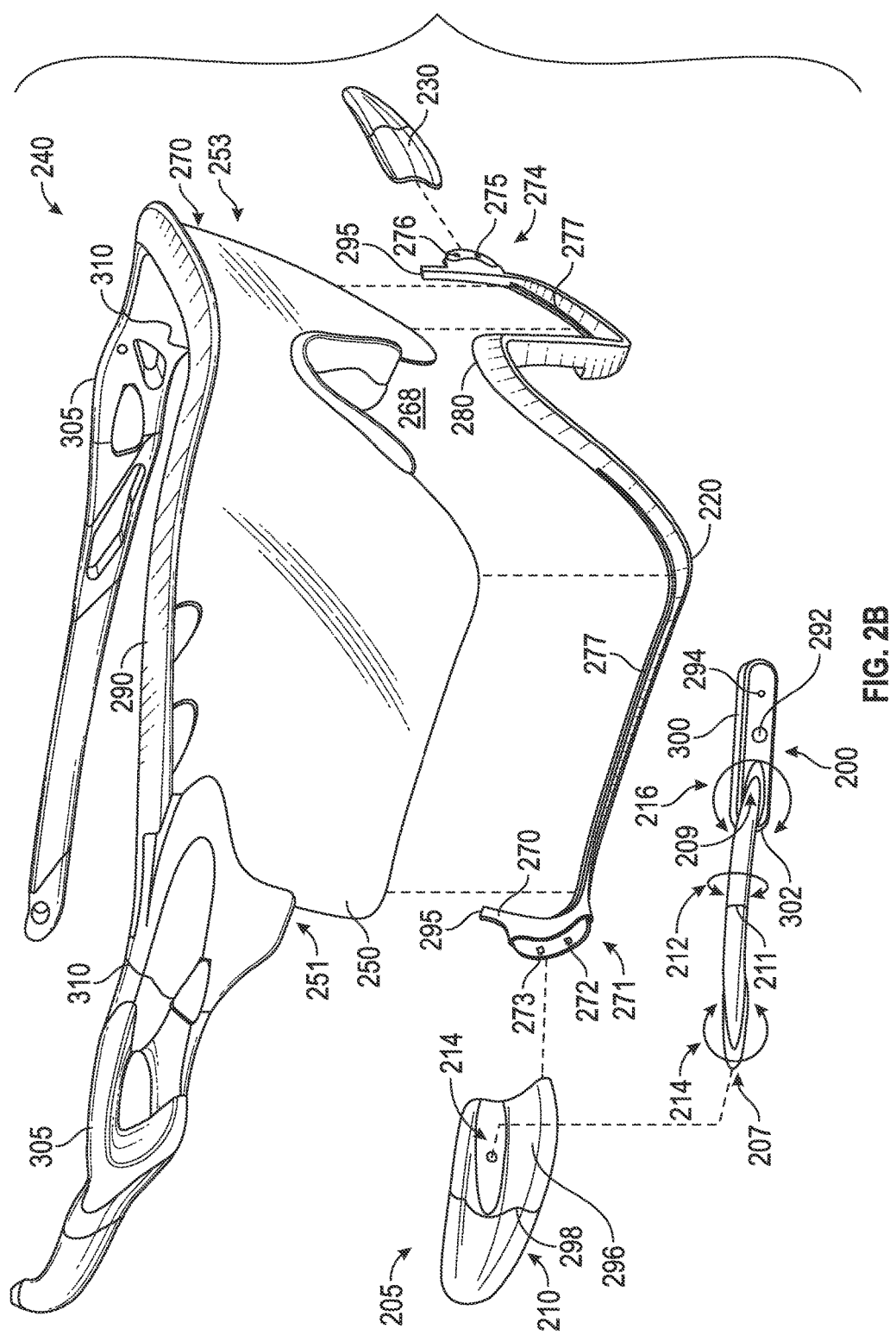
FIG. 2B is an exploded view of the modular communication system of FIG. 2A.
Figure 4:
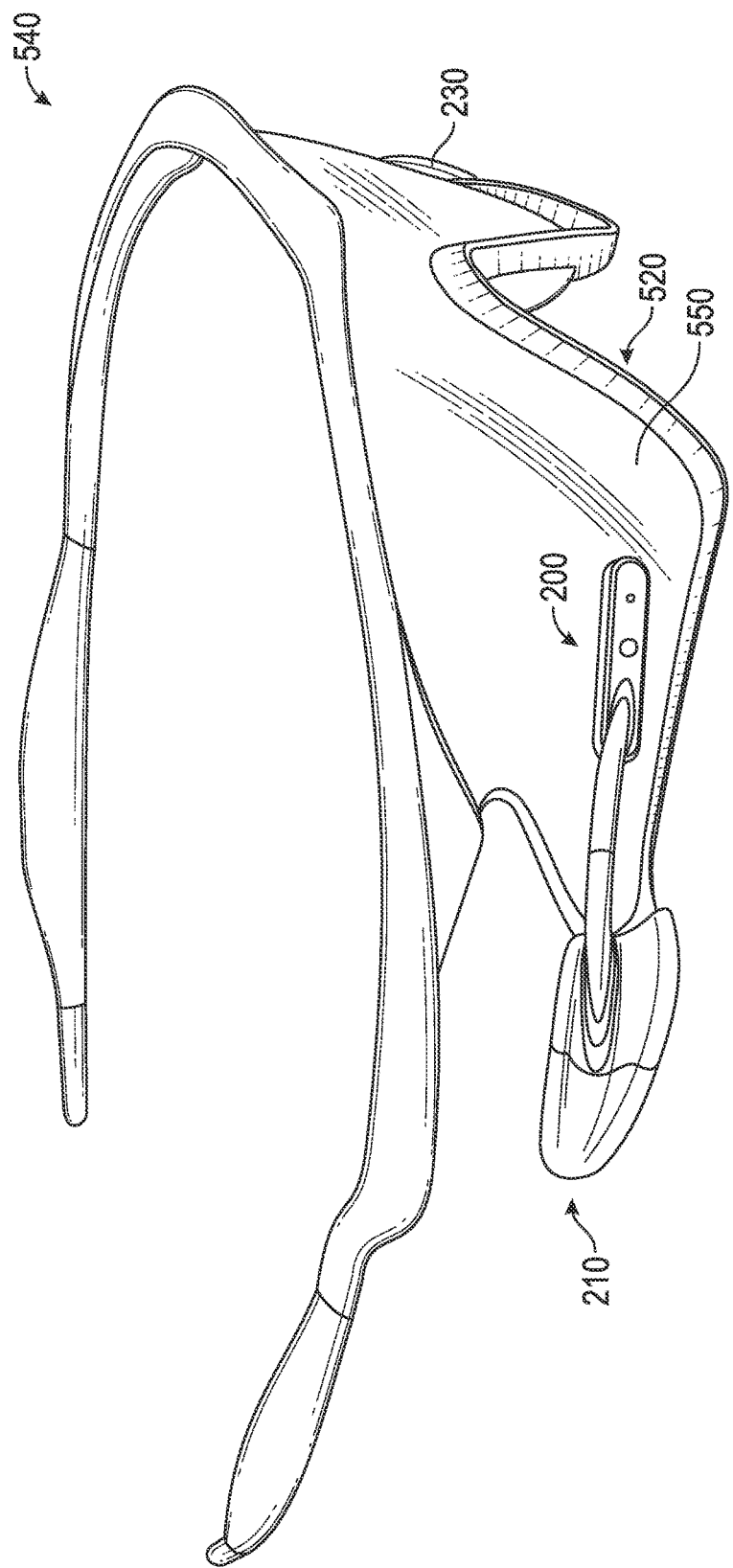
FIG. 4 is another pre-existing eyewear retrofitted with another exemplary embodiment of a modular communication system having interchangeable components.
Figure 5:
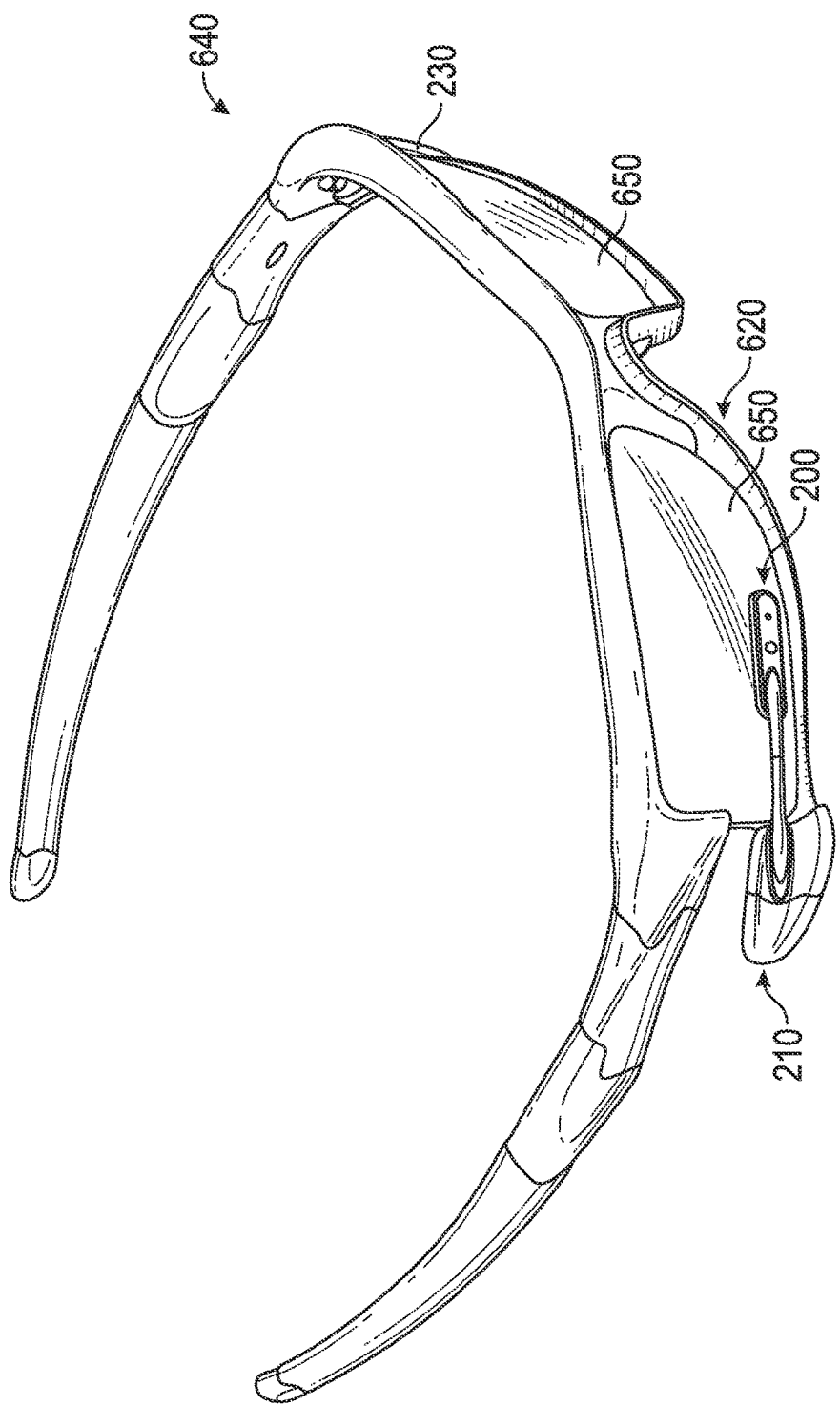
FIG. 5 is another pre-existing eyewear retrofitted with another exemplary embodiment of a modular communication system having interchangeable components.

FIGS. 2A and 2B illustrate an example of an eyewear 240 retrofitted with an electronically and mechanically interconnected communication system 205 for obtaining information, processing information, and/or conveying information to a user of the eyewear. FIGS. 4 and 5 illustrate other examples of eyewear 540 and 640 likewise retrofitted with such a communication system. With reference first to FIG. 2A, the communication system 205 can comprise an optical module 200, a first base module 210, a base link 220, and a second base module 230. As shown in the illustrated embodiment, each of these components 200, 210, 220, 230 can be both mechanically and electrically interconnected and can have structures and/or features that correspond to the respective components 100, 110, 120, 130 of FIG. 1. Of course, as described in connection with FIG. 1, in some embodiments, any or all of these components 200, 210, 220, 230 can be solely mechanically interconnected and/or not electronically interconnected. In some embodiments, such as the embodiment illustrated, eyewear 240 is a pre-existing eyewear product model which can be sold to a consumer with or without being attached with the communication system 205. The eyewear can comprise one or multiple (e.g., left and right) earstems 305 or other supporting structure for supporting the eyewear on the head of a wearer; one or more lenses 250 (monocular, for viewing by one eye only; unitary, with left and right eye viewing regions in a single lens; or dual lens, with separate left and right eye viewing regions); a nose bridge region 268; and first and second lateral regions 251, 253 (e.g., left and right sides of the eyewear). In some embodiments, one or more or all components of the communication system 205 as illustrated can be sold separately from the eyewear 240 to permit a consumer to attach such components to a previously or separately purchased eyewear product model.

The optical module 200 can comprise a proximal region that is attachable to a securing region in the communication system 205, such as a securing region on the first base module 210. Such attachment between the optical module 200 and the communication system 205 can be permanent and integral, or temporary and removable. As shown in the illustrated embodiment, the optical module 200 can be attached to the first base module 210. In some embodiments, the optical module 200 and first base module 210 are formed as a single unitary component, or in some embodiments the optical module 200 can attach directly to a region of eyewear rather than to another component of the communication system 205 or can attach directly to the base link 220. The optical module 200 can comprise a distal region that extends away from the proximal region generally in the medial direction (e.g., generally toward the medial plane of the head of a wearer of the eyewear 240). The distal region of the optical module 200 can comprise a visual display element or light source on a rear-facing surface (e.g., toward the wearer's eye) of the optical module 200 that is configured to provide visual information to a user, such as by projecting an image onto a retina of an eye of a user of the eyewear 240 or by producing a display with an image to be viewed by the user of the eyewear 240. The visual display element can comprise one or more electronic structures, such as selectively illuminated microstructures, and/or one or more lenses, to create and focus light to be conveyed to a user of the eyewear.

In some embodiments, the light source is not located on the optical module 200, but rather is located on another component of the communication system, such as in the first base module 210, the second base module 230, and/or the base link 220, which is configured to convey light to the optical module 200. The optical module 200 can in turn comprise a light-conveying structure, such as a light pipe or fiber optic cable, for transferring light produced on another component toward an eye of the user of the eyewear 240.

Figure 3:
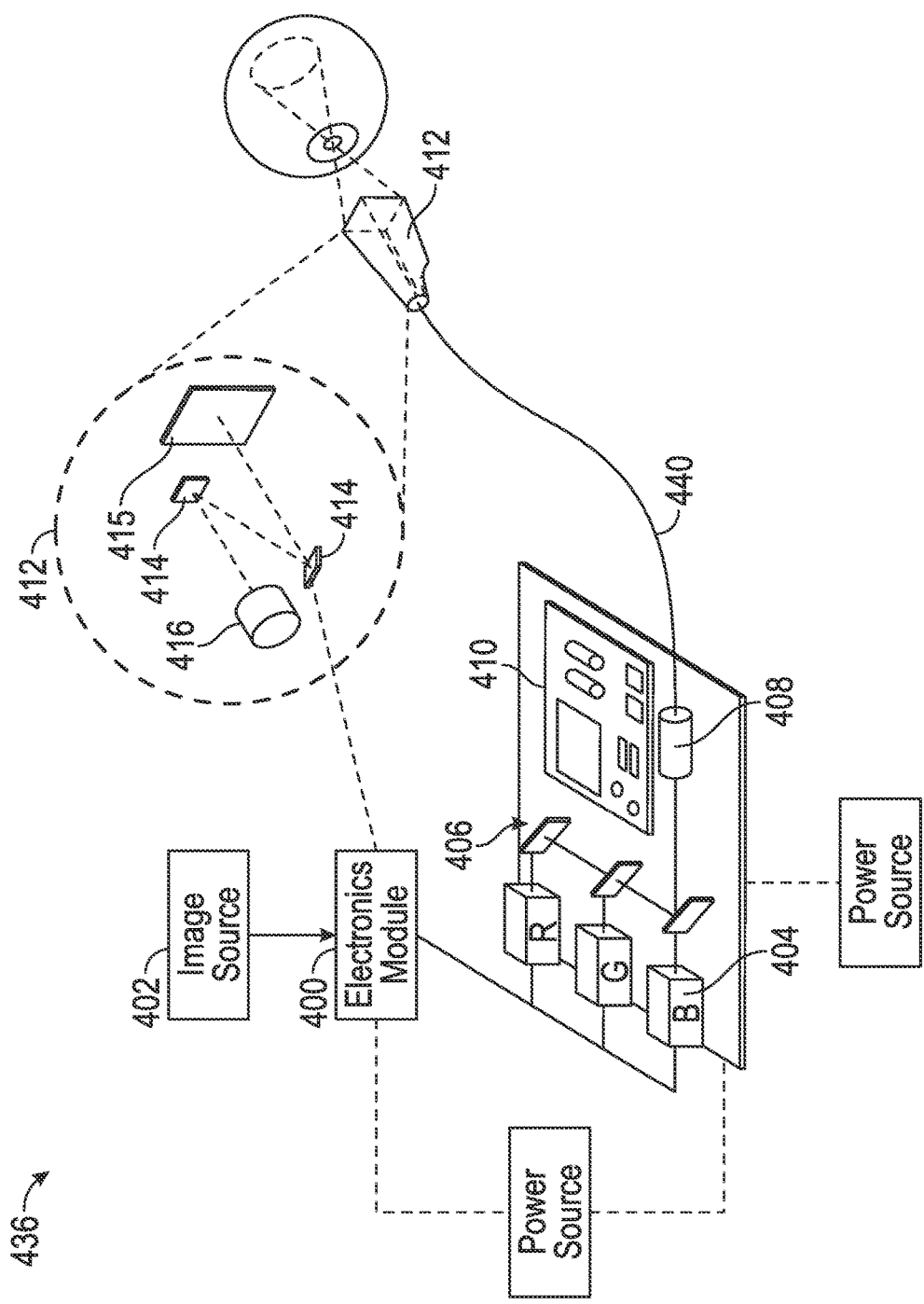
FIG. 3 is an example of an embodiment of electronic components for producing an image for use in a visual communication system for eyewear.

Referring to FIG. 3, an example of an image-forming and/or image conveying system 436 is illustrated. Many different types of such systems can be used in the communication system 10, 205. In some embodiments, the system 436 can include an electronics module 400 that receives image data from an image source 402. The image data can include information utilizable to create an image, such as placement and intensity of color in the image. The light source 404 can color the image in RGB and be modulated and combined utilizing the color combining optics 406, the photonics module 408, and the modulators 410. A scanner module 412, which can be mounted on or in the optical element 200, can project the optical beam onto the retina of the wearer in order to raster scan or convey the optical image onto the retina. In this regard, the scanner module 412 can include various micro electro-mechanical structures such as scanners 414, a diffuser 415, and a focusing lens 416. In some embodiments, the image can be conveyed in RGB at the rate of at least approximately 30 times per minute for premium resolution. The optical beam can be directly or indirectly projected toward the eye of the wearer. Therefore, although FIG. 3 illustrates direct retinal projection, it is contemplated that many other image-forming processes and structure can be used. For example, the optical beam can be reflected off or refracted by other structures incorporated into the optical element, such as the first and second lenses of the eyeglass or other reflective surface.

In accordance with some embodiments, the scanner module 412, as discussed above, can be incorporated into the optical element and be configured to provide the optical beam which is projected toward the eye of the wearer. Thus, first and second transmission surfaces of the first and second optical elements can each be configured to include the scanner module 412. The first and second transmission surfaces can project the optical beam toward the eye of the wearer within an angular range of allowability.

The optical module 100, 200 can be formed to include the transmission component 440. The transmission component 440 can communicate the image data from the light sources 404 to the scanner module 412. In some embodiments, the transmission component 440 can be mounted on the optical module 100, 200, and can include an optical fiber or waveguide. When the scanner module 412 is separate from the first and second transmission surfaces, the transmission component 440 may be disposed outside of the optical module 100, 200.

Any of the components illustrated in FIG. 3 or any components that help to accomplish the same or similar image-forming functions can be positioned or embedded within or can be supported by one or more of any of the components of the communication system 10, 205. For example, the power source and/or the electronics module can be embedded within or contained within or supported by the first or second base modules 110, 210, 130, 230, the base link 120, 220, 520, 620 or by one or more optical modules 100, 200.

With reference back to FIGS. 2A and 2B, the optical module or modules 100, 200 can be configured to be positioned and/or oriented in a plurality of positions in front of the eye or eyes of the wearer of the eyewear. In some embodiments, the positioning and/or orientation of the optical module or modules 100, 200 is accomplished by providing one or more adjustment or articulation regions: (a) in the optical module or modules 100, 200; (b) in the region of attachment where the optical module or modules 100, 200 connect with or are supported by any other component of the communication system 10, 205; and/or (c) in the other components of the communication system 10, 205 to which the optical module or modules 100, 200 are connected or on which the optical module or modules 100, 200 are supported, such as the first base module 110, 210, second base module 130, 230, and/or base link 120, 220, 520, 620.

In some embodiments, such as is illustrated in FIGS. 2A and 2B, the optical module 200 and/or one or more other components of the communication system 205 can include multiple different regions of adjustment or articulation to enable multidimensional movement of the optical display, such as two or three dimensional movement of the optical display. In some embodiments, the movement can include rotational movement, translational movement, sliding movement, and/or generally circular movement, etc. The adjustment or articulation regions can comprise one or more hinges, sliding components, ball joints, pistons, and/or any other suitable structure. The adjustment structure of the optical module or modules 100, 200 can comprise at least a first articulation region 207 (e.g., a first ball or swivel joint) at a base region located at or near the connection between the optical module or modules 100, 200 and the first base module 110, 210 (or another component of the communication system), and at least a second articulation region 209 (e.g., a second ball or swivel joint) on the optical module or modules 100, 200. The first and/or second articulation regions 207, 209 can permit rotational, swiveling, pivoting, or other movement such as is illustrated with arrow 212 and arrow 214 in FIG. 2A. In some embodiments, the second articulation 209 region can be located between an elongate shaft portion of the optical module or modules 100, 200 and a distal head region of the optical module or modules 100, 200 in which the image-forming or image-conveying components are located. A third articulation region 211 can be located on the elongate shaft portion of the optical module or modules 100, 200 to provide an additional or alternative degree of adjustment, such as a rotating adjustment as shown in arrow 212. In some embodiments, the third articulation region 211 can also provide translational movement, such as in a generally proximal-distal direction. In some embodiments, an additional articulation region can be provided to allow translation movement, such as in a generally proximal-distal direction or in any other direction.

The adjustment or articulation can help the wearer of the eyewear to adjust the optical module or modules 100, 200 to generally match and/or to accommodate the particular wearer's anatomical eye positioning, such as to generally fit the wearer's eye position from the lateral side of the user's head to the wearer's pupil and/or to generally correspond with the interpupilary distance (PD) between the wearer's pupils. The adjustment or articulation can be provided to help the wearer position the optical module or modules 100, 200 in a preferred position for a particular type of activity. For example, in a first activity such as bicycling, the optical module or modules 100, 200 may be positionable at a high position with respect to the lens 250 or lenses of the eyewear 240 since the wearer's head may frequently be directed downward with the wearer's eyes gazing at a steep upward angle. In a second activity, such as running or hiking, the optical module or modules 100, 200 may be positionable at a generally central position with respect to the lens 250 or lenses of the eyewear 240 since the wearer's head may be generally directed straight forward with the wearer's eyes gazing generally straight forward.

With continued reference to FIGS. 2A and 2B, in some embodiments, the optical module 200 can be disposed on a sliding piston or rod with respect to the first base module 110, 210 or other supporting structure in a biased or motion-resistant manner (e.g., using a spring-loaded piston or an air or liquid shock absorber or a resilient friction-inducing o-ring or other damping structure, etc.). Additionally or alternatively, the optical module 200 can be configured to automatically retract in a rearward direction toward a position under tension where the rearwardly facing display portion of the optical module 200 is configured to be positioned generally proximate to or abutting the front face or lens 250 or lenses of the eyewear 240 (e.g., using a spring or a resilient band or a compression-resistant structure such as a block of resilient material, etc., positioned inside of the optical module 200 and/or inside of the supporting structure for the optical module 200). In some embodiments, the optical module 200, or an elongate portion thereof, can be entirely or substantially entirely retracted into the first base module 110, 210 or into another structure of the communication system 205 for storage and/or for protection. In some embodiments, a user of the eyewear can articulate or adjust the position of the optical module 200 to a preferred position in multiple dimensions where the optical module 200 can remain generally fixed until deliberately readjusted or rearticulated by a user.

In a peripheral position mode, the optical module 200 can be rapidly moved (e.g., swiveled, rotated, and/or translated) away from the standard viewing mode (e.g., in a region generally in front of the eyewear 240 and/or generally in front of the lens 250 or lenses) to a peripheral position in situations when a wearer temporarily requires a substantially unobstructed field of vision through the eyewear. The optical module 200 can later be rapidly returned to the standard viewing mode. One or more adjustment features or settings previously made by the user can be preserved when the user transitions between the peripheral adjustment and standard viewing modes so that the user does not need to reconfigure fine adjustments each time the user transitions the optical module 200 between the peripheral and standard viewing modes.

In some embodiments, an interface 300 or light channel is provided in the distal region of the optical module 200. The interface 300 can achieve one or more functions at or near the boundary between the distal region of the optical module 200 and the front face of the lens 250 or lenses. For example, in some embodiments, the interface 300 can help to channel or direct the light produced by the optical module 200 toward the eye or eyes of the wearer; or the interface 300 can help resist ambient light interference or leakage into the region between the display portion of the optical module 200 and the lens 250 or lenses; or the interface 300 can help to cushion the optical module 200 or prevent the optical module from contacting the lens 250 or lenses and thereby scratching or otherwise damaging either or both components. In some embodiments, the interface 300 is dark to resist light reflection and/or the interface 300 is resilient or flexible.

With continued reference to FIGS. 2A and 2B, the first base module 210 can be removably attachable to the optical module 200. For example, the optical module 200 can be removed and replaced with a different optical module with a different aesthetic appearance or with different functionality; or the optical module 200 can be removed from the first base module 210 on one lateral side of the eyewear 240 and inserted into the second base module 230 on a generally opposing lateral side of the eyewear 240 to accommodate users' different left or right viewing preferences. In some embodiments, as illustrated, the first base module 210 can be removably attachable to a lateral region of an eyewear and/or to a first lateral region of the base link 220. For example, as shown in FIG. 2B, the first base module 210 can be removably attachable to a port 271 of the base link 220. As shown in the illustrated embodiment, port 271 can include a mechanical connection 272 for mechanically linking the first base module 210 to the base link 220 and/or an electrical connection 273 for electrically linking the first base module 210 to the base link 220. In some embodiments, the port 271 can include a recessed interior portion within the base link 220 to facilitate alignment and connection of the first base module 210 to the base link 220. The first base module 210 can extend in a generally rearward direction, generally parallel with the first earstem 305. The first base module 210 can be configured to extend along the side of a user's head when the communication system is attached to the eyewear 240 and the eyewear is placed on a user's head.

The second base module 230 can be removably attachable to a second optical module (not shown). The second base module 230 can be removably attachable to a second lateral region of the base link 220 that can be generally opposite from the first lateral region of the base link 220. For example, as shown in FIG. 2B, the second base module 230 can be removably attachable to a port 274 of the base link 220. As shown in the illustrated embodiment, port 274 can include a mechanical connection 275 for mechanically linking the second base module 230 to the base link 220 and/or an electrical connection 276 for electrically linking the second base module 230 to the base link 220. In some embodiments, the port 274 can include a recessed interior portion within the base link 220 to facilitate alignment and connection of the second base module 230 to the base link 220. The second base module 230 can extend in a generally rearward direction, generally parallel with a second earstem 305 and generally parallel to the first base module, configured to extend along the other lateral side of a user's head when the communication system is attached to the eyewear and the eyewear is placed on a user's head.

In some embodiments, a module, such as the first and second base modules 210, 230, can be removably attachable to a medial region of the eyewear, such as a nose bridge region 268. The base link 220 can include a port (not shown) similar to ports 271, 274 at or proximate the nose bridge region 268. In some embodiments, the module attached to the base link 220 at or proximate the nose bridge 268 can be configured to contact the nose bridge of a user of the system 10, 205. This can be advantageous especially if the module contains a physiological sensor configured to contact the skin of the user.

In some embodiments, the first and/or second base modules 210, 230 and/or any other component disclosed and/or illustrated herein can change shape between generally open (for use) and generally closed (for storage) configurations of the eyewear 240. For example, in a first open stage, the first and/or second base modules 210, 230 can comprise an elongate shape, and in a second closed stage, the first and/or second base modules 210, 230 can comprise a compact shape. As illustrated, each of the first and/or second base module 210, 230 can comprise a hinge or joint or other moving region 298 where the module 210, 230 can fold or bend or otherwise move to decrease the length of the module 210, 230 in a compact shape. In some embodiments, the portion of the first and/or second modules 210, 230 that is directly connected to the base link 220 is shorter than the portion behind the hinge or joint that extends further toward the rear of the wearer's head during the viewing position so that a majority of the first and/or second modules 210, 230 can be hingedly or pivotally moved generally behind the front face of the eyewear 240 or the lens 250 or lenses in a compact storage position (along with folding the earstems 305 generally behind the front face of the eyewear 240 or the lens 250 or lenses). In some embodiments, the position of the hinge or joint 298 on the first and/or second modules 210, 230 can be generally vertically aligned with the position of the hinge or joint 310 of either or both of the earstems 305.

In the illustrated embodiment of FIGS. 2A and 2B, the base link 220 extends from a first lateral 251 region of the eyewear 240 to a second lateral region 253 of the eyewear 240 that is generally opposite from the first lateral region 251. The base link 220 can extend along a lower side of a unitary lens 250 of eyewear 240 or along an underside of multiple lenses of an eyewear (such as eyewear 640 of FIG. 5). In some embodiments, the base link 220 can extend along the bottom periphery of the unitary lens 250 without extending wholly upwards along the first and/or second lateral regions 251, 253. The base link 220 can traverse the nose bridge region 268 of the eyewear 240. In some embodiments, the base link 220 can replace the nosepiece component of the pre-existing eyewear 240. In some embodiments, as illustrated, the base link 220 can be shaped and/or oriented to closely or generally match and closely or generally correspond to shape and contours of the lower side of a lens 250 or lenses of an eyewear. The base link 220 can help to preserve the aesthetic appearance and the functional benefits of a particular lens or other eyewear structure through such shaping and/or orientation.

The base link 220 can comprise a variety of structures to achieve performance advantages in the eyewear 240. For example, the base link 220 can include resilient nose pads in a nose bridge portion 280 that face inwardly toward the user during use to cushion or to help properly and comfortably position the eyewear 240 on the user's face; and/or the base link 220 can include soft or resilient cushioning or sealing material along the periphery of the lens 250 or eyewear frame 290 (such as along the lower periphery) to create an obstruction or seal between the eyewear 240 and the user's face in order to resist or to control the flow of air or the ingress of foreign matter (e.g., dirt or dust) into the region between the user's eyes and the rear surface of the lens or lenses.

In some embodiments, the base link 220 can be shaped and/or structured to help attach the base link 220 to the eyewear 240. For example, the base link 220 can comprise a securing structure, such as a groove 277 or other concave cross-sectional shape, into which a bottom edge of the lens 250 or lenses of the eyewear can be inserted to help secure the base link 220 to such lens 250 or lenses. The groove can be substantially deeper than it is wide to help provide a secure connection between the base link 220 and the lens 250. The interior of the securing structure can comprise a slip-resistant, high-friction surface, such as a silicone or other resilient material, to resist inadvertent withdrawal of the lens 250 or lenses from the securing structure. In some embodiments, the base link 220 can be biased inwardly such that when the lens 250 or lenses or lens-mounting structure of the eyewear are received within the groove 277 or other securing structure, the base link 220 applies a biasing force towards the lens 250 or lenses to resist inadvertent withdrawal of the lens 250 or lenses from the groove 277 or other securing structure. In some embodiments, the base link 220 can include additional or alternative attaching features, such as a tightening clip or screw which can bias the base link 220 to the lens 250 or lenses or lens-mounting structure.

In some embodiments, the base link 220 can comprise one or more generally curved or generally horizontal bottom portions 260, one or more generally vertical side portions 270, and/or a nose bridge portion 280. The base link 220 can be generally rigid or generally resilient so as to be biased toward a generally upwardly concave shape formed by its component portions (e.g., one or more of portions 260, 270, 280) that generally matches or is slightly larger or slightly smaller than the lower profile of the lens 250 or lenses.

In some embodiments, when the base link 220 is attached to the lower edge of the eyewear 240, such as the lower edge of the lens 250 or lenses, an inwardly directed restoring force can be produced in the resilient base link 220 that urges one or more regions 260, 270, 280 of the base link 220 in an inward direction (generally toward the medial plane of the eyewear or wearer of the eyewear), securely against the sides and/or bottom of the lower region of the eyewear 240, such as the lower region of the lens 250 or lenses, to help retain the base link 220 on the eyewear 240. In some embodiments, as illustrated, the base link 220 attaches directly to a lower edge or lower region of a lens 250 or lenses; however, in some embodiments that include an eyewear frame with orbitals that extend partially or completely around a lower region of a lens 250 or lenses, the base link 220 can attach to and generally match the shape of the lower region of the eyewear orbital frame, without requiring direct attachment to a lens.

The base link 220 can comprise one or more connectors 295 that attach to the frame 290 and/or earstems 305 of the eyewear 240 at a securing region, such as at or near the region where the upper frame of the eyewear 240 joins the earstem 305 of the eyewear, to help retain the base link 220 to the eyewear. For example, the connectors can comprise one or more hooks, protrusions and indentions, latches, or other selectively connectable structure. In some embodiments, such as is illustrated in FIGS. 2A and 2B, the base link 220 can extend continuously and curvilinearly from a first lateral region 251 at or near an upper frame portion of the eyewear 240, to a first corner lateral region of the lens 250, along a bottom region of the lens 250, to a nose bridge region 268 of the eyewear 240, to a second corner lateral region of the lens 250, to a second lateral region 253 at or near the upper frame member. In some embodiments, the base link 220 can be configured to extend across one or more other regions of an eyewear, such as across an upper or top region of the eyewear 240. For example, the base link 220 can be configured to generally or closely match the shape of and removably connect with an upper portion of a front frame of an eyewear. In some embodiments, the base link 220 can be configured to extend solely across the lateral, lower, and/or bottom region of the eyewear 240.

As illustrated in FIGS. 2A-2B, 4 and 5, in some embodiments the base link 220, 520, 620 can be configured to closely or generally match or closely or generally correspond to a particular type of eyewear and/or a particular type of eyewear lens or lenses. As shown in FIGS. 2A-2B, 4 and 5, the lenses 250, 550, 650 of eyewear 240, 540, 640 each have a different lens profile or perimeter shape. The base link 120, 220, 520, 620 can be formed to generally correspond to or generally follow this lens profile or perimeter. Base link 520 and 620 illustrated in FIGS. 4 and 5 can have structures and/or features that correspond to the base link 120 of FIG. 1 and base link 220 of FIGS. 2A-2B described herein. In some embodiments, the base link 120, 220, 520, 620 can be designed such that the base link extends around the periphery of the lens that is not attached to the frame of the eyewear. In some embodiments, the base link 120, 220, 520, 620 is only attached to the periphery of the lens and not attached to the frame of the eyewear. Accordingly, the entire periphery of the lens can be surrounded by one of the frame and/or the base link 120, 220, 520, 620. In some embodiments, a base link 120, 220, 520, 620 can be universal to multiple types of eyewear or eyewear lenses. For example, the base link 120, 220, 520, 620 can be generally conformable or malleable to generally closely match the contours or shape of any of a variety of different types of eyewear to which it is intended to be secured. In some embodiments, the base link 120, 220, 520, 620 can comprise a series of spaced-apart attachment regions, such as snaps, clips, or grasping members, to help secure the base link 120, 220, 520, 620 to the eyewear. In some embodiments, the base link 120, 220, 520, 620 can itself be modular so as to permit the base link 120, 220, 520, 620 to be extended, shortened, or contoured using smaller subcomponents to construct a base link 120, 220, 520, 620 that generally matches the shape of the desired eyewear.

In some embodiments, the base link 120, 220, 520, 620 comprises one or a plurality of electrical conductors for conveying electrical power and/or information between a first region and a second region of the eyewear, such as between a first lateral region and a second lateral region of the eyewear. The base link 120, 220, 520, 620 can be generally or entirely hollow so that the electrical conductors can be contained within the base link 120, 220, 520, 620 and the conductors are not visible during use normal use of the eyewear. In some embodiments, at least the outer surface of the base link 120, 220, 520, 620 is made of a polymer or plastic material. In some embodiments, the outer surface of the base link 120, 220, 520, 620 is a conductor and can convey electrical energy between different regions of the eyewear 20, 240, 540, 640. The electrical conductors can be co-molded or tightly embedded within the material of the base link 120, 220, 520, 620, or the electrical conductors can be applied to an inner or outer portion of the base link 120, 220, 520, 620 using a surface application, such as printing, painting, or deposition.

A plurality of different types of base links, such as base links 120, 220, 520, 620, with different functional or aesthetic characteristics (e.g., different shapes, sizes, colors, etc.), can be provided to enable a user to generally custom match a base link 220 in a retrofit manner with a particular type of lens or a particular type of eyewear, or to produce different desired aesthetic appearances. In some embodiments in which one or more components 100, 110, 120, 130, 200, 210, 220, 230, 520, 620 of the communication system comprise modular connections, a user can interchange one or more of such components.

For example, a user can purchase a single optical module such as optical modules 100, 200, a single first base module such as first base modules 110, 210, a single second base module such as second base modules 130, 230, and multiple base links such as base links 120, 220, 520, 620 for use with different models of eyewear such as eyewear 20, 240, 540, 640. When a user desires to use a first model of eyewear with a communication system such as communication systems 10, 205, the user can rapidly attach the optical module to the first base module, the first base module to a first base link, and the first base link to the second base module, and then attach these assembled modular components to the desired eyewear lens and/or frame. When a user desires to use the first model of eyewear without the communication system, the user can rapidly and easily remove the communication system from the eyewear. When a user desires to use a second model of eyewear with the communication system, the user can remove the modular components of the communication system from the first model of eyewear or retrieve the communication system from a storage location, and then the user can remove the first base link from the first base module and/or from the second base module, and the user can attach a second base link to the first base module and/or to the second base module. The first and second base links can have different shapes to generally match or generally correspond to different lens and/or frame profiles of the eyewear to be used by the wearer. In another example, a user can purchase a set of components of a communication system, such as an optical module, a first base module, a base link, and a second optical module for use with a single eyewear. Later, as more advanced components are developed with different functionality or as a user's preferences change, a user can purchase a different optical module, a different first base module, and/or a different second base module, while retaining the same modular base link for use with the same initial eyewear.

In some embodiments, electrical power is provided by an onboard battery that is supported by or positioned within one of the components 100, 110, 120, 130, 200, 210, 220, 230, 520, 620 of the communication system 10, 205. In many embodiments, a battery is provided in either or both of the first or second base modules 110, 130, 210, 230. In some embodiments, a battery is provided in the base link 120, 220, 520, 620. External power sources may also be utilized. An external charger can be connected with a component of the communication system, such as with one of the first or second base modules 110, 130, 210, 230 and/or the base link 120, 220, 520, 620, to supply external electrical power to be stored in an onboard battery for later use. In some embodiments, an external battery can be connected to the communication system for extended use. For example, in some uses of eyewear, such as during bicycling or other activities, a battery can be stored in a helmet, backpack, utility belt, or other external location carried on the body, and placed in electrical connection with the communication system 10, 205, such as through either or both of the first and second base modules 110, 130, 210, 230 and/or the base link 120, 220, 520, 620. For example, either or both of the first and second base modules 110, 130, 210, 230 and/or the base link 120, 220, 520, 620 can have one or more first conductive contact element(s), and a helmet or other external structure configured to be carried by a person can have one or more second conductive contact element(s) configured to be electrically connected to a battery located in the helmet or other external structure when the eyewear, communication system 10, 205, and external structure are worn by the user. In some embodiments, the conductive contact element(s) can be included on the frame of the eyewear.

The communication system 10, 205 can comprise additional or alternative information-gathering or information-conveying structures, such as one or more microphones 294, speakers 296, lights, cameras 292, temperature sensors, heart-beat sensors, electrolyte sensors, and/or any transducers that can provide information about the user of the eyewear or the environment of the user of the eyewear. The information-gathering or information-conveying structures can be located in any suitable location or on any suitable component of the communication system and/or on the eyewear. For example, one or more microphones 294 or cameras 292 can be located on the optical module 200; one or more microphones 294 or speakers or earplugs can be located on the first or second base modules 110, 210, 130, 230 and/or the base link 120, 220, 520, 620; one or more temperature, heartbeat, or electrolyte sensors can be located in a region that provides close proximity or contact with the user's skin, such as on or near a nose bridge portion 280 of the base link 120, 220, 520, 620 or a module attached thereto.

It is emphasized that many variations and modifications may be made to the herein-described embodiments, the elements of which are to be understood as being among other acceptable examples. All such modifications and variations are intended to be included herein within the scope of this disclosure. Any of the steps described herein can be performed simultaneously or in an order different from the steps as ordered herein. The features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments.

The following is claimed:

1. A modular communication system configured to be removably attachable to eyewear with a first lateral region, a second lateral region, and a front face, the modular communication system comprising:
 a base link comprising a first port, the base link being configured to be selectively attachable to and removable from eyewear by a user along a portion of the front face of the eyewear, the base link extending, when attached to the eyewear, from the first lateral region of the eyewear to the second lateral region of the eyewear; and
 a first base module comprising a connector, the connector being selectively attachable to and removable from the first port of the base link by a user.

2. The modular communication system of claim 1, wherein the base link is shaped to correspond to a lens profile of a lens or a lens mount of the eyewear.

3. The modular communication system of claim 2, wherein the base link extends along a bottom periphery of the lens or lens mount.

4. The modular communication system of claim 2, wherein the base link is selectively attachable to and removable from the lens or lens mount.

5. The modular communication system according to claim 2, the base link further comprising a securing structure configured to secure the base link to the lens or lens mount of the eyewear.

6. The modular communication system of claim 5, wherein the securing structure is a groove formed along a surface of the base link.

7. The modular communication system of claim 5, wherein at least a portion of the base link is configured to be selectively attachable directly to and removable directly from the lens.

8. The modular communication system of claim 2, wherein the connector of the first base module is selectively attachable to and removable from a port of a second base link by a user, the second base link being shaped to follow a different lens profile from that of the base link.

9. The modular communication system of claim 8, wherein the base link is shaped to correspond to a lens profile of a dual-lens eyewear and the second base link is shaped to correspond to a lens profile of a unitary lens eyewear.

10. The modular communication system of claim 1, the base link further comprising a connector configured to secure the base link to a frame of the eyewear.

11. The modular communication system of claim 10, wherein the connector comprises at least one of a hook, a protrusion, an indention, and a latch.

12. The modular communication system of claim 1, wherein the first port is positioned about a lateral region of the eyewear.

13. The modular communication system of claim 1, wherein the first port is positioned about a nose bridge region of the eyewear.

14. The modular communication system of claim 1, further comprising a second base module comprising a connector, the connector being selectively attachable to and removable from a second port of the base link.

15. The modular communication system according to claim 14, wherein the first base module and the second base module are in electrical communication via the base link.

16. The modular communication system of claim 1, further comprising an optical module configured to display an image to a user.

17. The modular communication system of claim 16, wherein the optical module comprises a retinal projector.

18. The modular communication system of claim 1, further comprising the eyewear.

19. The modular communication system of claim 1, wherein the first base module comprises at least one of a transmitter, a receiver, and a transceiver.

20. The modular communication system of claim 1, wherein the first base module comprises at least one of a speaker, a microphone, and a camera.

21. The modular communication system of claim 1, wherein the first base module comprises at least one of an environmental sensor, a velocity sensor, and a physiological sensor.

22. The modular communication system of claim 21, wherein the first base module comprises at least one of a heartbeat sensor and a velocity sensor.

23. The modular communication system of claim 1, wherein the modular communication system is configured to be removably attachable to eyewear with integrated electronics.

24. The modular communication system of claim 23, further comprising the eyewear with integrated electronics.

25. The modular communication system of claim 1, wherein at least one of the first base module and the base link comprises a conductive contact element configured to electrically couple with a conductive contact element of a structure separate from an eyewear.

26. The modular communication system of claim 25, wherein the structure separate from an eyewear is a helmet.

27. The modular communication system of claim 1, wherein the base link is formed of a malleable material.

28. The modular communication system of claim 1, wherein the base link is formed of a rigid material.

* * * * *